(12) United States Patent
Chen

(10) Patent No.: US 10,601,810 B2
(45) Date of Patent: *Mar. 24, 2020

(54) PRIVATE CLOUD ROUTING SERVER CONNECTION MECHANISM FOR USE IN A PRIVATE COMMUNICATION ARCHITECTURE

(71) Applicant: Kingston Digital, Inc., Fountain Valley, CA (US)

(72) Inventor: Ben Wei Chen, Fountain Valley, CA (US)

(73) Assignee: Kingston Digital, Inc., Fountain Valley, CA (US)

(*) Notice: Subject to any disclaimer, the term of this patent is extended or adjusted under 35 U.S.C. 154(b) by 225 days.

This patent is subject to a terminal disclaimer.

(21) Appl. No.: 14/741,145

(22) Filed: Jun. 16, 2015

(65) Prior Publication Data

US 2015/0288678 A1   Oct. 8, 2015

Related U.S. Application Data

(63) Continuation-in-part of application No. 14/663,244, filed on Mar. 19, 2015, now Pat. No. 9,935,930,
(Continued)

(51) Int. Cl.
G06F 7/04       (2006.01)
G06F 15/16      (2006.01)
(Continued)

(52) U.S. Cl.
CPC .......... *H04L 63/083* (2013.01); *H04L 63/029* (2013.01); *H04L 63/0272* (2013.01);
(Continued)

(58) Field of Classification Search
CPC ......... H04L 29/08306; H04L 29/06319; H04L 29/06326; H04L 29/06333;
(Continued)

(56) References Cited

U.S. PATENT DOCUMENTS 5,408,618 A   4/1995  Aho et al.
6,438,594 B1  8/2002  Bowman-Amuah
(Continued)

FOREIGN PATENT DOCUMENTS

GB      2341523       3/2000
WO   WO2011133908   10/2011

OTHER PUBLICATIONS

Matt Smollinger, "Iomega Home Media Network Hard Drive—Cloud Edition Reviewed", Mar. 2011, https://www.smallnetbuilder.com/other/cloud/cloud-storage/311-iomega-home-media-network-hard-drive-cloud-edition-reviewed.*
(Continued)

*Primary Examiner* — Michael Simitoski
(74) *Attorney, Agent, or Firm* — Brundidge & Stanger, P.C.

(57) ABSTRACT

A method is disclosed for providing a secure session based message connection mechanism between a private cloud routing server (PCRS) and at least one smart device client in a PCRS network. The method includes initializing and provisioning of the PCRS. The method also includes creating a PCRS Client and viewing the PCRS Client. In addition, the method includes editing a peer-to-peer password and status of the PCRS. The method also includes changing the peer-to-peer password by the at least one smart device client. The method also includes resetting the peer-to-peer password and status by an administrator from a PCRS LAN. Finally, the method includes connecting to the PCRS by the at least one smart device client.

14 Claims, 13 Drawing Sheets

Related U.S. Application Data which is a continuation-in-part of application No. 14/526,393, filed on Oct. 28, 2014, now Pat. No. 9,781,087, which is a continuation-in-part of application No. 14/450,104, filed on Aug. 1, 2014, now Pat. No. 10,237,253, which is a continuation-in-part of application No. 13/229,285, filed on Sep. 9, 2011, now Pat. No. 9,203,807.

(51) Int. Cl.
| | | |
|---|---|---|
| G06F 17/30 | (2006.01) | |
| H04L 29/06 | (2006.01) | |
| H04L 29/08 | (2006.01) | |
| H04W 12/06 | (2009.01) | |

(52) U.S. Cl.
CPC .............. *H04L 63/08* (2013.01); *H04L 63/10* (2013.01); *H04L 63/102* (2013.01); *H04L 63/164* (2013.01); *H04L 67/1002* (2013.01); *H04W 12/06* (2013.01)

(58) Field of Classification Search
CPC ......... H04L 29/08144; H04L 29/12009; G06F 17/30206; G06F 17/30209
See application file for complete search history.

(56) References Cited

U.S. PATENT DOCUMENTS

| | | | |
|---|---|---|---|
| 6,563,515 B1 | 5/2003 | Reynolds et al. | |
| 6,779,004 B1 | 8/2004 | Zintel | |
| 6,954,790 B2 | 10/2005 | Forslow | |
| 6,978,314 B2 | 12/2005 | Tarr | |
| 6,981,041 B2 | 12/2005 | Araujo et al. | |
| 7,068,680 B1 | 6/2006 | Kaltenmark et al. | |
| 7,120,429 B2 | 10/2006 | Minear et al. | |
| 7,219,140 B2 | 5/2007 | Marl et al. | |
| 7,293,077 B1 | 11/2007 | Teo et al. | |
| 7,328,256 B2 | 2/2008 | Taoyama et al. | |
| 7,392,034 B2 | 6/2008 | Westman et al. | |
| 7,408,882 B2 | 8/2008 | Abdo et al. | |
| 7,467,198 B2 | 12/2008 | Goodman et al. | |
| 7,487,230 B2 | 2/2009 | Gu et al. | |
| 7,558,846 B2 | 7/2009 | Gu et al. | |
| 7,562,393 B2 | 7/2009 | Buddhikot et al. | |
| 7,602,756 B2 | 10/2009 | Gu et al. | |
| 7,627,653 B2 | 12/2009 | Taoyama et al. | |
| 7,630,341 B2 | 12/2009 | Buddhikot et al. | |
| 7,636,764 B1 | 12/2009 | Fein | |
| 7,640,340 B1 | 12/2009 | Stapp et al. | |
| 7,640,546 B2 | 12/2009 | Zarenin et al. | |
| 7,647,203 B1 | 1/2010 | Herz | |
| 7,676,690 B2 | 3/2010 | Bucher et al. | |
| 7,788,656 B2 | 8/2010 | Harper | |
| 7,810,148 B2 | 10/2010 | Bed-Shacher et al. | |
| 7,978,714 B2 | 7/2011 | Rao et al. | |
| 8,045,000 B2 | 10/2011 | Davidson et al. | |
| 8,069,217 B2 | 11/2011 | Lo et al. | |
| 8,170,209 B2 | 5/2012 | Peng et al. | |
| 8,300,056 B2 | 10/2012 | Nugent et al. | |
| 8,412,798 B1 | 4/2013 | Wang | |
| 9,729,625 B1 | 8/2017 | Davidson | |
| 9,781,087 B2 | 10/2017 | Chen | |
| 9,935,930 B2 | 4/2018 | Chen | |
| 2002/0147810 A1 | 10/2002 | Traversat | |
| 2004/0223469 A1 | 11/2004 | Bahl et al. | |
| 2005/0286476 A1 | 12/2005 | Crosswy et al. | |
| 2006/0271968 A1 | 11/2006 | Zellner | |
| 2006/0291434 A1 | 12/2006 | Gu et al. | |
| 2007/0165579 A1* | 7/2007 | Delibie | H04L 12/66 370/338 |
| 2007/0294368 A1 | 12/2007 | Bomgaars et al. | |
| 2008/0016491 A1 | 1/2008 | Doepke | |
| 2008/0019333 A1 | 1/2008 | Kharia et al. | |
| 2008/0162698 A1 | 7/2008 | Hopen et al. | |
| 2008/0201751 A1 | 8/2008 | Ahmed et al. | |
| 2008/0301794 A1 | 12/2008 | Lee | |
| 2009/0019492 A1 | 1/2009 | Grasset | |
| 2009/0092133 A1* | 4/2009 | Mok | H04L 29/12311 370/389 |
| 2009/0106394 A1* | 4/2009 | Lin | H04L 29/125 709/218 |
| 2009/0129301 A1 | 5/2009 | Belimpasakis | |
| 2009/0303973 A1 | 12/2009 | Patil | |
| 2010/0036955 A1 | 2/2010 | Hopen et al. | |
| 2010/0188987 A1 | 7/2010 | Azimi et al. | |
| 2010/0205309 A1 | 8/2010 | Skog | |
| 2010/0251335 A1 | 9/2010 | Srisuresh | |
| 2010/0332626 A1* | 12/2010 | Jonsson | H04L 29/1282 709/220 |
| 2011/0107379 A1 | 5/2011 | Lejoie et al. | |
| 2011/0145418 A1 | 6/2011 | Pratt et al. | |
| 2011/0145821 A1 | 6/2011 | Philipson et al. | |
| 2012/0030584 A1 | 2/2012 | Brian | |
| 2012/0036233 A1* | 2/2012 | Scahill | H04L 29/12066 709/220 |
| 2012/0042102 A1 | 2/2012 | Chung et al. | |
| 2012/0042275 A1 | 2/2012 | Neerudu et al. | |
| 2012/0081382 A1 | 4/2012 | Lindahl et al. | |
| 2012/0084798 A1 | 4/2012 | Reeves et al. | |
| 2012/0236796 A1* | 9/2012 | Lazaridis | H04L 29/12301 370/328 |
| 2012/0307141 A1 | 12/2012 | Millet et al. | |
| 2012/0311329 A1 | 12/2012 | Medina et al. | |
| 2013/0024545 A1 | 1/2013 | Sheppard et al. | |
| 2013/0067550 A1 | 3/2013 | Chen et al. | |
| 2013/0177891 A1 | 7/2013 | Hammerschmidt | |
| 2013/0231146 A1 | 9/2013 | Mathias et al. | |
| 2014/0141721 A1 | 5/2014 | Kim et al. | |
| 2014/0306865 A1 | 10/2014 | Pan et al. | |
| 2014/0359477 A1 | 12/2014 | Chen | |
| 2014/0372517 A1 | 12/2014 | Zuili | |
| 2015/0327313 A1 | 11/2015 | Kim et al. | |

OTHER PUBLICATIONS

Iomega —an EMC Company, "Iomega StorCenter ix4-200d User Guide", Jul. 2010, http://www.wiredzone.com/mmenglish/others/32026148-manual.pdf.*

Guy McDowell, "How does a Router work", Oct. 2009, Applicant's submit prior art.*

Seagate, Seagate Access for Personal Cloud User Manual, Apr. 2015, Seagate.com, https://www.seagate.com/manuals/network-storage/seagate-personal-cloud/seagate-access/sdrive/.*

Malik, Om (May 22, 2009) "How Pogoplug Works" gigaom.com http://gigaom.com/2009/05/22/how-pogoplug-works/.

Mldonkey (Oct. 5, 2010) "WhatFirewallPortsToOpen" mldonkey.sourceforge.net http://mldonkey.sourceforge.net/WhatFirewallPortsToOpen.

Rue Liu, "Iomega Home Media Hard Drive Cloud Edition Review—SlashGear", Jun. 2011, SlashGear, http://www.slashgear.com/iomega-home-media-hard-drive-cloud-edition-review-14156840/.

Filename "2012 Sep WiFi-Miracast brochure.pdf" Miracast-paper: "Wi-Fi CERTIFIED MiracastTM: Extending the Wi-Fi experience to seamless video display" published by Wi-Fi Alliance on Sep 19, 2012.

Filename: "WiFi Miracast Demo video—Screenshots and Transcript.pdf" Screenshots and Transcripts of "Wi-Fi CERTIFIED MiracastTM Demo at 2013 CES" video https://www.youtube.com/watch?v=cYagdOp9y7E published by Wi-Fi Alliance on Jan 9, 2013.

Filename: "Jul. 2011 Samsung Remote App.pdf" Samsung App Profile: Remote App published published online on Jul. 30, 2011.

Filename: "Mar. 2013 panasonic-my-home-screen-smart-tv.pdf" "Panasonic My Home Screen Smart TV Interface" published online on Mar. 6, 2013.

Filename: "Jul. 2012 samsung-tv-remote-app" "Samsung TV Remote app not working for some 2012" online article published on Jul. 18, 2012.

(56) References Cited

OTHER PUBLICATIONS

Craig Ellison, "Iomega Home Media Network Hard Drive—Cloud Edition Reviewed", SmallCloudBuilder.com, Mar. 29, 2011, http://www.smallcloudbuilder.com/storage/reviews/311-iomega-home-media-network-hard-drive-cloud-edition-reviewed.

Guy McDowell, "How Does a Router Work", Oct. 2009, http://www.makeuseof.com/tag/technology-explained-how-does-a-router-work/.

Use Yahoo Messenger for a Video or Audio Conference, Mar. 2005, http://education.ucf.edu/techfac/docs/videochattutorial.pdf.

\* cited by examiner

PRIVATE CLOUD ROUTING SERVER CONNECTION MECHANISM FOR USE IN A PRIVATE COMMUNICATION ARCHITECTURE

CROSS-REFERENCE TO RELATED APPLICATION

This application is a continuation-in-part of U.S. patent application Ser. No. 14/663,244, filed Mar. 19, 2015, entitled "PRIVATE AND SECURE COMMUNICATION ARCHITECTURE WITHOUT UTILIZING A PUBLIC CLOUD BASED ROUTING SERVER", which is a continuation-in-part of U.S. patent application Ser. No. 14/526,393, filed Oct. 28, 2014, entitled "PRIVATE AND SECURE COMMUNICATION ARCHITECTURE WITHOUT UTILIZING A PUBLIC CLOUD BASED ROUTING SERVER", which is a continuation-in-part of U.S. patent application Ser. No. 14/450,104, filed Aug. 1, 2014, entitled "PRIVATE CLOUD ROUTING SERVER, PRIVATE NETWORK SERVICE AND SMART DEVICE CLIENT ARCHITECTURE WITHOUT UTILIZING A PUBLIC CLOUD BASED ROUTING SERVER," which is a continuation-in-part of U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," all of which are incorporated herein by reference in their entireties.

FIELD OF THE INVENTION

The present invention relates generally to networking and more particularly to the use of private cloud networks.

BACKGROUND OF THE INVENTION

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and any place to retrieve services from one or many serving parties or servers. The services include audio, video contents, live or archived information, and execution of applications, social media, messaging, email, storage, backup, calendar, contact, synchronization, sharing, remote desktop, Internet of Things (IoT) and others. Other services include real-time private and secure video, audio, text and application communication between at least two Smart Device Clients. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server is a private cloud storage server (PCSS). The PCSS sits within the local area network (LAN) managed by the user. It provides on-line and backup storage for the user either within the LAN or in the wide area network (WAN). The user is able to use a Smart Device Client to access information within the private cloud storage server at anytime from anywhere. The private cloud storage server and the associated Smart Device Client therefore form an example of the Private Cloud Server and Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed IP address and open certain ports for the router in front of the PCSS, such that the Smart Device Client is able to locate the PCSS from outside the LAN and to authenticate itself, penetrate the firewall and establish a secure communication channel with the PCSS.

A second solution applies when a fixed IP address is not available. The user configures the LAN router of the PCSS and opens certain ports to map to the PCSS. The router is therefore able to be located by the intended Smart Device Client through a dynamic DNS (DDNS) service on the WAN. The Smart Device Client can authenticate itself, penetrate the firewall and establish a secure communication channel with the PCSS.

A third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

A fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix- and match of the above mentioned solutions.

In a first scenario, a fixed IP address is required and the router needs to be set up and configured. The down side is that a fixed IP involves more cost and is usually not available in the home and small business environment. The router set up and configuration can be very complicated and are not user friendly with most consumers.

In a second scenario, a DDNS service is required and the router needs yet more complex set up. Again, the DDNS set up involves additional cost and complexity into the system. The router set up and configuration can be very complicated and is not user friendly with most consumers.

In a third and fourth scenarios, an outside routing server or service needs to be established, while a router set up is not necessary. The outside routing server or service controls and handles login/authentication between the Smart Device Client and the server. The private cloud becomes less private and less secure through the public cloud based server or service. If for any reason the server or service is down, the communication and availability of the private cloud storage server will be jeopardized.

All of these scenarios require technical expertise that may be suitable for conventional corporate environment, but these scenarios are not suitable for consumer oriented Smart Device Client centric deployment.

In most conventional systems, an outside or public cloud based routing server is used by the Smart Device Client during access to a Private Cloud Service. Using an outside server creates a number of concerns to the Smart Device Client owner.

First, the sense of trust is always in question, because the outside or public cloud based routing server is a middleman during all communication transactions between the Smart Device Client and the Private Cloud Service. It may hold all user account info, password and their corresponding IP addresses of the Smart Device Client and the Private Cloud Service. The routing server is able to sniff any communication in-between and render it insecure.

Second, being an outside and public cloud based routing server, the business model of the owner of server may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Conventionally, in the case of communication between two Smart Device Clients, both parties need to sign in to a public cloud based server in order to conduct real-time video, audio, text or application communication. The privacy and security are easily compromised due to the fact that the communication has to go through a public cloud based server, as outlined above.

Accordingly, what is needed is a system and method that addresses the above identified issues. The present invention addresses such a need.

SUMMARY OF THE INVENTION

A method for use with a public cloud network is disclosed. The method includes setting up at least one private cloud routing server (PCRS) and at least one smart device client in a client server relationship. The at least one private cloud routing server includes a first message box associated therewith. The first message box being located on a public cloud network. The at least one smart client includes a second message box associated therewith. The second message box being located on the public cloud network. The method also includes passing a session based message between the first message box and the second message box in a secure manner.

The secure session based message connection mechanism between the private cloud routing server and the at least one smart device client comprises initialization and provisioning of the PCRS Creation of a PCRS Client, viewing the PCRS Client, editing a PCRS peer-to-peer password and status by an administrator, changing the PCRS peer-to-peer password by the at least one smart device client, resetting the PCRS peer-to-peer password and status by an administrator from the PCRS LAN and connecting to the PCRS by the at least one smart device client. The session based message is authenticated by the private cloud routing server and the at least one smart device client. The smart device client and the private cloud routing server can communicate with each other after the session based message is authenticated.

At least one private network service is then securely accessible by the smart device client through the public cloud network based upon the authenticated session based message. The method also includes setting up the at least another smart device client in a client server relationship with the at least one private cloud routing server. The at least two smart device clients and the private cloud routing server can communicate with each other after the session based message is authenticated. The at least two smart device clients can privately and securely communicate with each other through the public cloud network.

DETAILED DESCRIPTION

Figure 1:
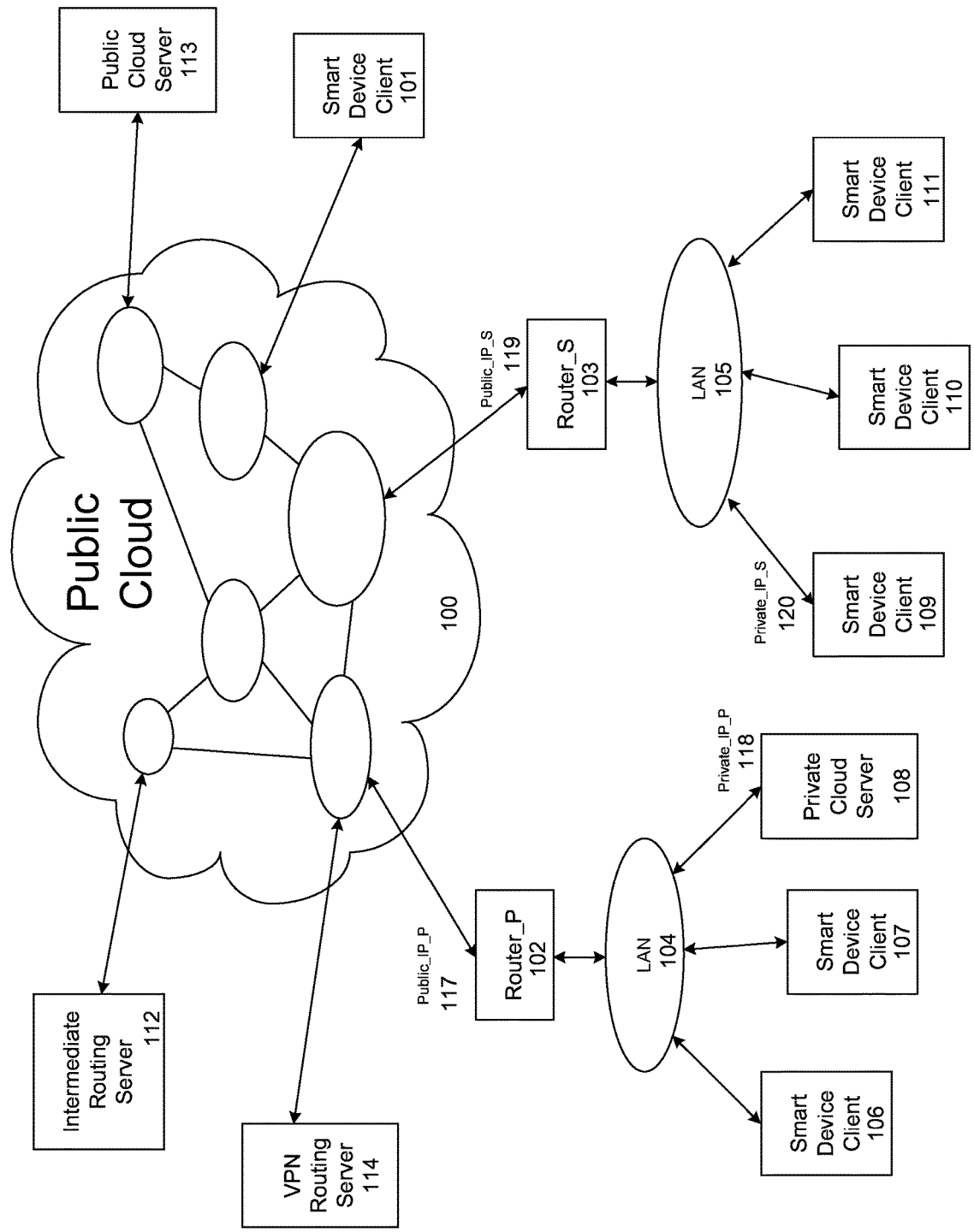
FIG. 1 is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer oriented environment for a Smart Device Client in a WAN to be able to obtain services from a Private Cloud Storage Server (PCSS) or any Private Cloud Server (PCS):

1. Access the Private Cloud Server (PCS) at anytime from anywhere.
2. Access the PCS behind the firewall with fixed or dynamic IP address.
3. Require no outside or public cloud based routing server in the WAN.
4. Require no additional router setup in the LAN.
5. Authenticate with the PCS.
6. Establish a secure communication channel with the PCS.

If such challenges can be met and resolved, the deployment of the Private Cloud Server or service will increase exponentially, due to plug and play simplicity and availability. The technical and business concern will also be removed by not utilizing a public cloud based routing server. The Private Cloud Server being utilized for storage, remote desktop service and Internet of Things (IoT) becomes very affordable and ubiquitous in the private cloud infrastructure.

In the private cloud environment, if there are more than one private cloud servers or services co-existing at the same time, it is advantageous to separate out the functions of Private Cloud Server into two functional blocks including Private Cloud Routing Service (PRS) and Private Network Service (PNS). The PNS is designed to be managed and accessed on the private network environment, be it wired or wireless, by the Smart Device Client. Examples of a PNS include application program server to provide remote desktop protocol (RDP), VNC, office tools, media player, and other user specific applications. The PNS may also function as a storage server that contains multiple terabytes of storage serving the private cloud. Functions of the PRS of the multiple Private Cloud Routing Servers can then be aggregated together into just one Private Cloud Routing Server (PCRS). The PCRS can generally be referred to as a Private Cloud Router.

A system and method in accordance with the present invention addresses the following challenges in the consumer oriented environment for utilizing the Smart Device Client in the WAN to be able to manage and access Private Network Service (PNS) from a Private Cloud Routing Server (PCRS):

1. Access the Private Cloud Routing Server (PCRS) at anytime from anywhere.
2. Access the PCRS behind the firewall with fixed or dynamic IP address.
3. Require no outside or public cloud based routing server in the WAN.
4. Require no additional router setup in the LAN.
5. Authenticate with the PCRS.
6. Establish a secure communication channel with the PNS to manage and access.

If the PCRS can fulfill the above mentioned challenges, heterogeneous Private Cloud Servers from different manufacturers and vendors can then be broken down into simpler Private Network Services and remove the complexity of private cloud setup, configuration and access The purpose of a system and method in accordance with the invention is to provide a Private Cloud Routing Server (PCRS), Private Network Service and Client architecture without utilizing a routing server. The system and method in accordance with the present invention addresses the above identified challenges that to allow a Client to be able to access the Private Network Service (PNS) from anywhere at anytime. The system and method also accesses the PNS behind a firewall with fixed or dynamic IP, requires no additional router setup and no public cloud based routing server in the WAN, to authenticate with the PCRS, and to establish a secure communication channel directly with the PNS.

As shown in FIG. 1, a cloud network infrastructure includes a public cloud 100, a public cloud server 113, an intermediate routing server 112, a VPN routing server 114, a Smart Device Client 101 in the WAN, a Router_P 102 and a Router_S 103. The Router_S 103 connects between a LAN 105 and the Internet in public cloud 100. The Router_P 102 connects between a LAN 104 and the Internet in public cloud 100. Behind the LAN 104, there are Smart Device Clients 106, 107 and a Private Cloud Server (PCS) 108. Behind the LAN 105, there are Smart Device Clients 109, 110 and 111. The Smart Device Client can be a PC, notebook, tablet, eBook reader, GPS, smart TV, set top box, MP3 player, or any networkable embedded device.

They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the Private Cloud Server 108. First, a Smart Device Client 107 determines whether the target is in the locally accessible LAN 104 and decides to connect to the Private Cloud Server 108 directly. Second, the Smart Device Client 101 determines the target is not in the locally accessible LAN 104 and decides to connect through the WAN to the public cloud 100. The WAN locates the Router_P 102 and LAN 104, and then connects to the Private Cloud Server 108. Third, the Smart Device Client 109 determines the target is not in the locally accessible LAN 105 and decides to passes through LAN 105, Router_S 103, and connects to the public cloud 100 in the WAN.

The Smart Device Client 109 then locates Router_P 102, LAN 104 and connects to the Private Cloud Server 108. The first and the second scenario are two special cases and derivatives of the third scenario. Therefore, it is beneficial to focus on the third scenario that is broader in scope and complexity.

The routing server message box 216 or client message box 215, can be hosted inside an email server, text message server, web server, or any kind of server that can host secure message for information exchange between the Private Cloud Routing Server 208, as a server, and the Smart Device Client 206, 207, 209, 210, 211, 201, 221, as a client. The Routing Server Message Box message_box_P 216 or Client Message Box message_box_S 215, is accessible and under the secure and private control of either Private Cloud Routing Server 208, as a server, or the Smart Device Client 206, 207, 209, 210, 211, 201, 221, as a client. The security and business model of the message box is well understood and expected in the industry by the user. For any reason either message box is down, it can be replaced or redeployed immediately without jeopardizing the communication between the server and the client in the private cloud infrastructure.

Figure 2:
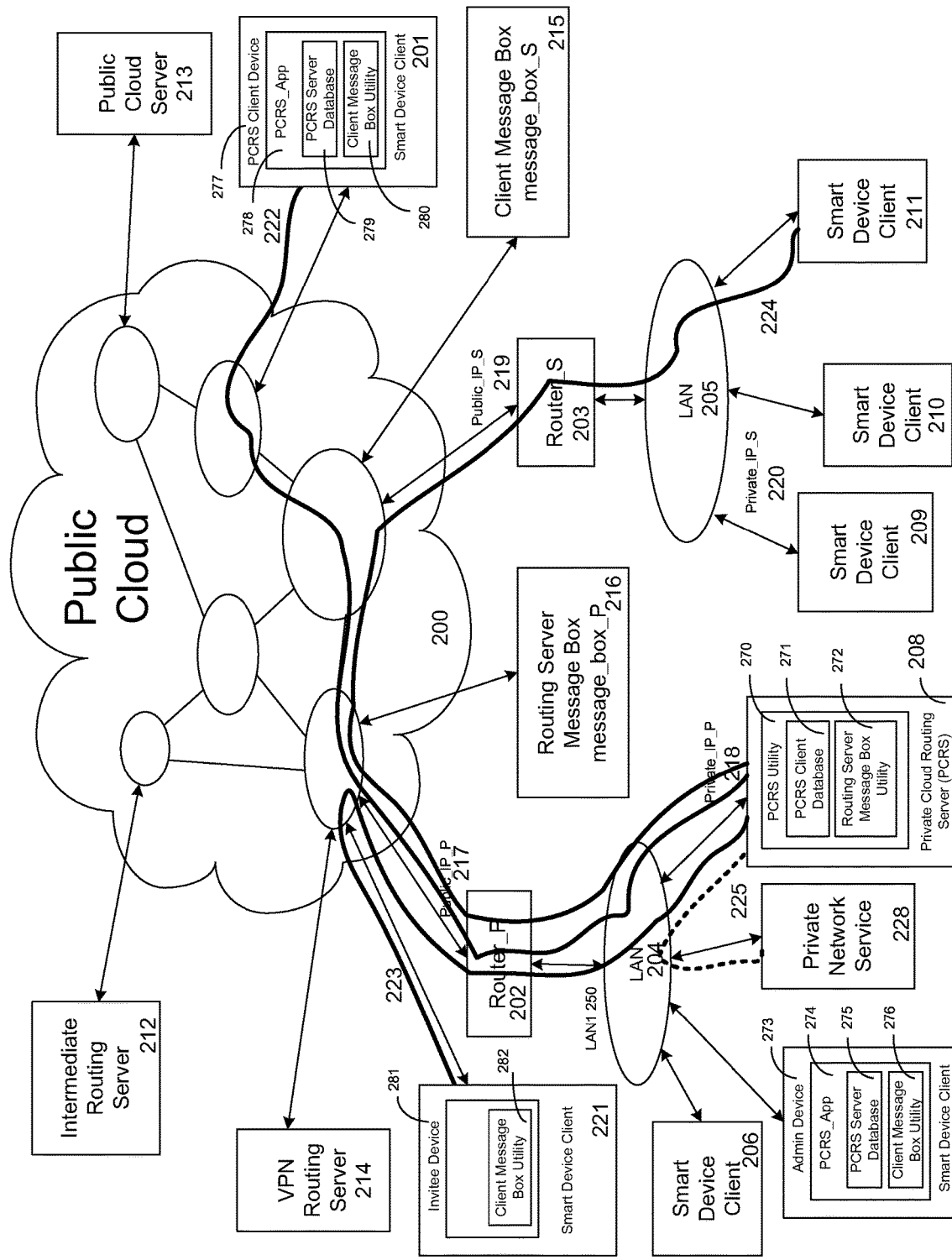
FIG. 2 is a block diagram of a first embodiment of a Cloud Network. Infrastructure for the connection mechanism between the Private Cloud Routing Server and the Smart Device Client in accordance with the present invention.

FIG. 2 shows a block diagram of a first embodiment of a Cloud Network Infrastructure for a secure connection mechanism between the Private Cloud Routing Server and the Smart Device Client for the exploring and accessing of Private Network Service across the public cloud. The Smart Device Client 201, 211 and 221, through the communication path 222, 224 and 223 respectively are able to locate the Private Cloud Routing Server 208 with the mechanism disclosed in FIG. 5 through 11 The Private Cloud Routing Server 208 then builds a virtual LAN VLAN 240 allowing the authorized Smart Device Clients 201, 211 and 221 to join in as members of the virtual LAN VLAN 240. The Smart Device Client 201 through the installed program can initiate a private and secure communication as a host. The Smart Device Client 211 or 221 through the installed program can receive the communication invitation as a guest and join the private and secure communication session with the host Smart Device Client 201.

As shown in FIG. 2, when a Smart Device Client 201 wants to start a communication session as a host, the program installed on the host Smart Device Client first locates and logs-in to the Private Cloud Routing Server (PCRS) 208 through the communication path 222. After locating the Private Cloud Routing Server 208, it joins the virtual LAN VLAN 240. The Smart Device Client commits to join chat communication as a host 201. The program allows the Smart Device Client 201 to create and host a communication session. The program broadcasts the host session to invite communication guest 221. Afterwards, the program starts scanning for recognizable guest 221. Once the guest is authenticated, the Smart Device Client 201 can start private and secure communication as a host with the authenticated guest Smart Device Client 221. The private and secure communication includes video, audio, text or application. The application can be a program, utility, operation or remote desktop that is recognizable by both host and guest.

If the Smart Device Client 211 or 221 wants to join a communication session as a guest, the program installed on the guest Smart Device Client first locates and logs-in to the Private Cloud Routing Server (PCRS) 208 through the communication path 224 or 223 respectively. After locating the Private Cloud Routing Server 208, it joins the virtual LAN VLAN 240 under the server. The Smart Device Client commits to join chat communication as a client. The program waits for a communication invitation. Once it receives a communication invitation, the Smart Device Client 211 or 221 may join a communication session as a guest. The program then starts scanning for recognizable host. Upon identifying the host, the program goes through the communication log-in authentication prompted by the host. Once authenticated, the Smart Device Client can join the communication session. The Smart Device Client 211, 221 starts private and secure communication as a guest with the host Smart Device Client 201. The private and secure communication includes video, audio, text or application. The application can be a program, utility, operation or remote desktop that is recognizable by both host and guest.

In another embodiment of the present invention, the Smart Device Client can establish a private and secure communication with any service that is reachable on the physical LAN, LAN1 250 or virtual LAN VLAN 240 under the Private Cloud Routing Server. As shown in FIG. 2, once the Smart Device Client 201, 211 or 221 locates and logs-in to the Private Cloud Routing Server 208, it may access any Private Network Service 228 that is reachable on the physical LAN, LAN1 250, LAN2 260, and virtual LAN VLAN 240 under the Private Cloud Routing Server through a secure communication path 225. The Private Network Service includes audio, video contents, live or archived information, and execution of applications, social media, messaging, email, storage, backup, calendar, contact, synchronization, sharing, remote desktop, Internet of Things (IoT) and others.

In an embodiment, the communication path 225 between the Private Cloud Routing Server (PCRS) and the Smart Device Client may include seven sets of commands:
1. Initialize and Provision a PCRS (by an Admin from a LAN)
2. Create a PCRS Client (by the Admin from a LAN)
3. Register to a PCRS (by a PCRS Client from WAN PCRS LAN)
4. Connect to a PCRS (by a PCRS Client from a WAN PCRS LAN)
5. View a PCRS Client (by the administrator from a PCRS LAN)
6. Reset a PCRS peer-to-peer password and status (by the administrator from the PCRS LAN)
7. Change the PCRS peer-to-peer password (by the PCRS Client through a virtual private network (VPN) from a CRS LAN)

A number of entities are introduced to allow for the secure communication path 225 including but not limited to: Administrator, Admin Device, PCRS Utility, PCRS Client Device, Invitee and Invitee Device. These entities are defined herein below. Utility is a utility running in the Private Cloud Routing Server. Admin Device is a device that administrator uses to configure the PCRS. PCRS Client Device is a device that an Invitee uses to communicate with the PCRS. Invitee is a physical party invited by the Admin to access the PCRS service and resources. Invitee Device is a Smart Device Client that the Invitee uses to communicate with the PCRS.

A number of terms are introduced including Access_Code, Code_Expiration, Address_Invitee, Address_PCRS_Client, Hash_Password_PCRS_P2P, Password_PCRS_P2P_Expiration, and Status in PCRS Client database. These terms are defined hereinbelow. Access_Code is an invitee access code sent by Admin through PCRS via message box 216. Code_Expiration is an expiration date/time of the access code for security purpose. Address_Invitee is a message box address of the invitee. Address_PCRS_Client is a message box address of the PCRS Client which may be different from the invitee. Hash_Password_PCRS_P2P is a hashed password for the PCRS peer-to-peer communication. It is stored in the PCRS Client database. The actual password Password_PCRS_P2P is never stored in PCRS for security consideration. The Password_PCRS_P2P_Expiration is the expiration of the Password_PCRS_P2P. The Status is the Active, Inactive or Deleted status of the PCRS Client record in the PCRS Client database.

Other terms not associated with the PCRS client database are: Address_PCRS, Password_PCRS, Password_PCRS_Client and Virtual LAN subnet. They are defined herein below. Address_PCRS and Password_PCRS are used to configure the message box account of the PCRS. They are used only once during initialization and provisioning of PCRS and is never stored for security purpose. Address_PCRS_Client and Password_PCRS_Client are used to configure the message box account of the PCRS Client. They are used only once during creation of PCRS Client in the database. While the Address_PCRS_Client is stored in the database, the Password_PCRS_Client is never stored for security purpose. Virtual LAN subnet is the subnet setting of the VPN (virtual private network). It is configurable and changeable to specify the private subnet for security purpose.

As shown in FIG. 2, the Private Cloud Routing Server (PCRS) 208 contains a PCRS_Utility 270, which in turn contains a PCRS Client database 271 and a Routing Server Message Box utility 272. The PCRS Client database 271 contains the registered list of PCRS clients. The message box utility 272 is able to communicate with the Routing Server Message Box 216.

The Admin Device 273 is itself a Smart Device Client 207. It contains an application utility PCRS_App 274, which in turn contains a PCRS Server database 275 and a Client Message Box utility 276. The PCRS Server database 275 contains the registered list of PCRS servers. The message box utility 276 is able to communicate with the Client Message Box 215.

The PCRS Client Device 277 is itself a Smart Device Client 201. It contains an application utility PCRS_App 278, which in turn contains a PCRS Server database 279 and a Client Message Box utility 280. The PCRS Server database 279 contains the registered list of PCRS servers. The message box utility 280 is able to communicate with the Client Message Box 215.

Figure 5:
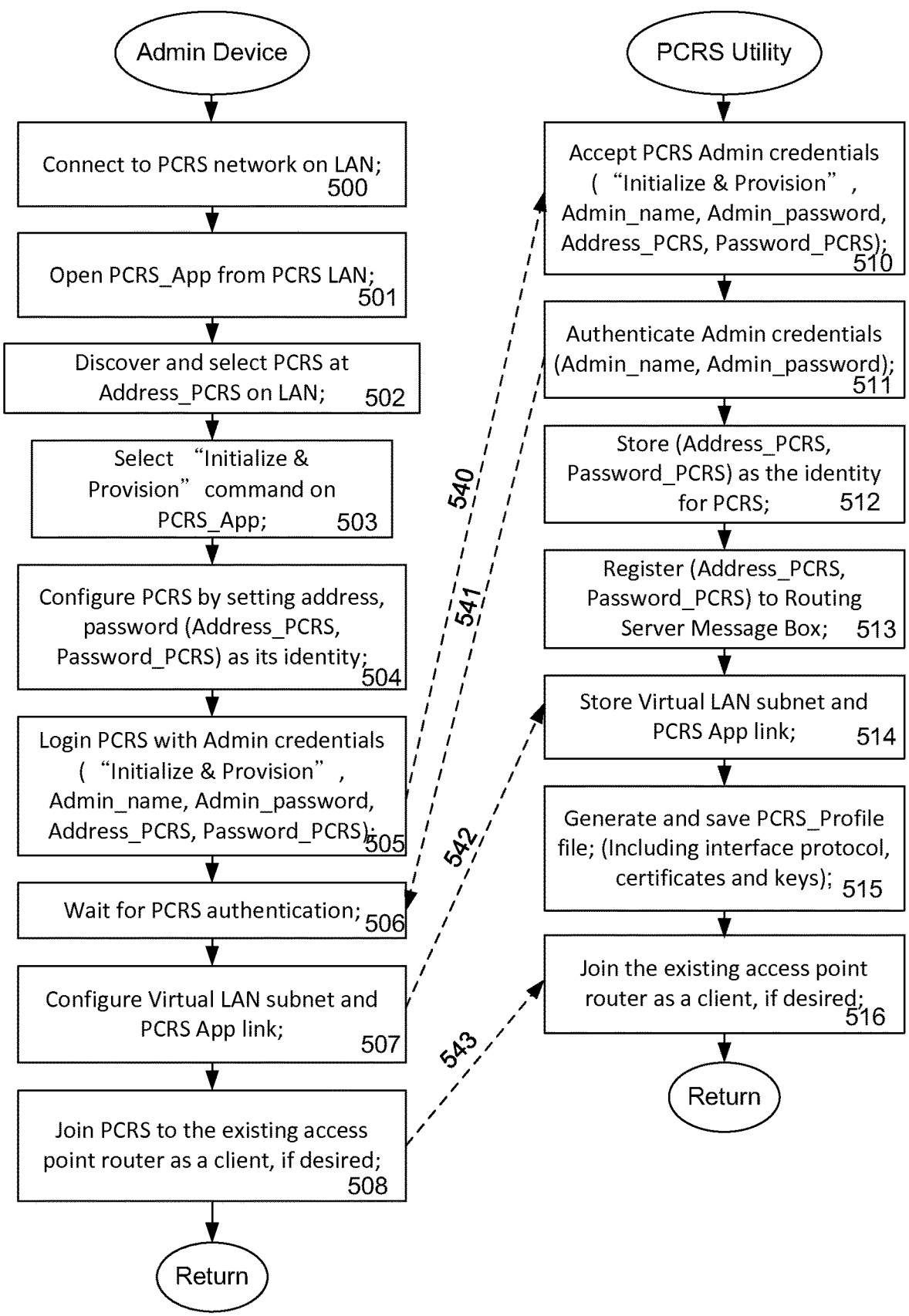
FIG. 5 shows the communication flow of Initializing and Provisioning of the Private Cloud Routing Server by Admin in accordance with the present invention.

The Invitee Device 281 is itself a Smart Device Client 221. It contains a Client Message Box utility 282. The message box utility 282 is able to communicate with the Client Message Box 215. The administrator uses the utility PCRS_App 274 to initialize and provision the PCRS 208, as shown in FIG. 5, from Admin Device 207. The Admin Device 207 is located on the same physical LAN 204 as that of PCRS 208, in order to conduct configuration for security purpose to avoid hacking exposure on Internet or WAN. The administrator first configures the PCRS Routing server message box credentials by setting its account name and password. The PCRS Routing server message box credentials are then sent to PCRS Utility 270 in the PCRS 208.

Figure 6:
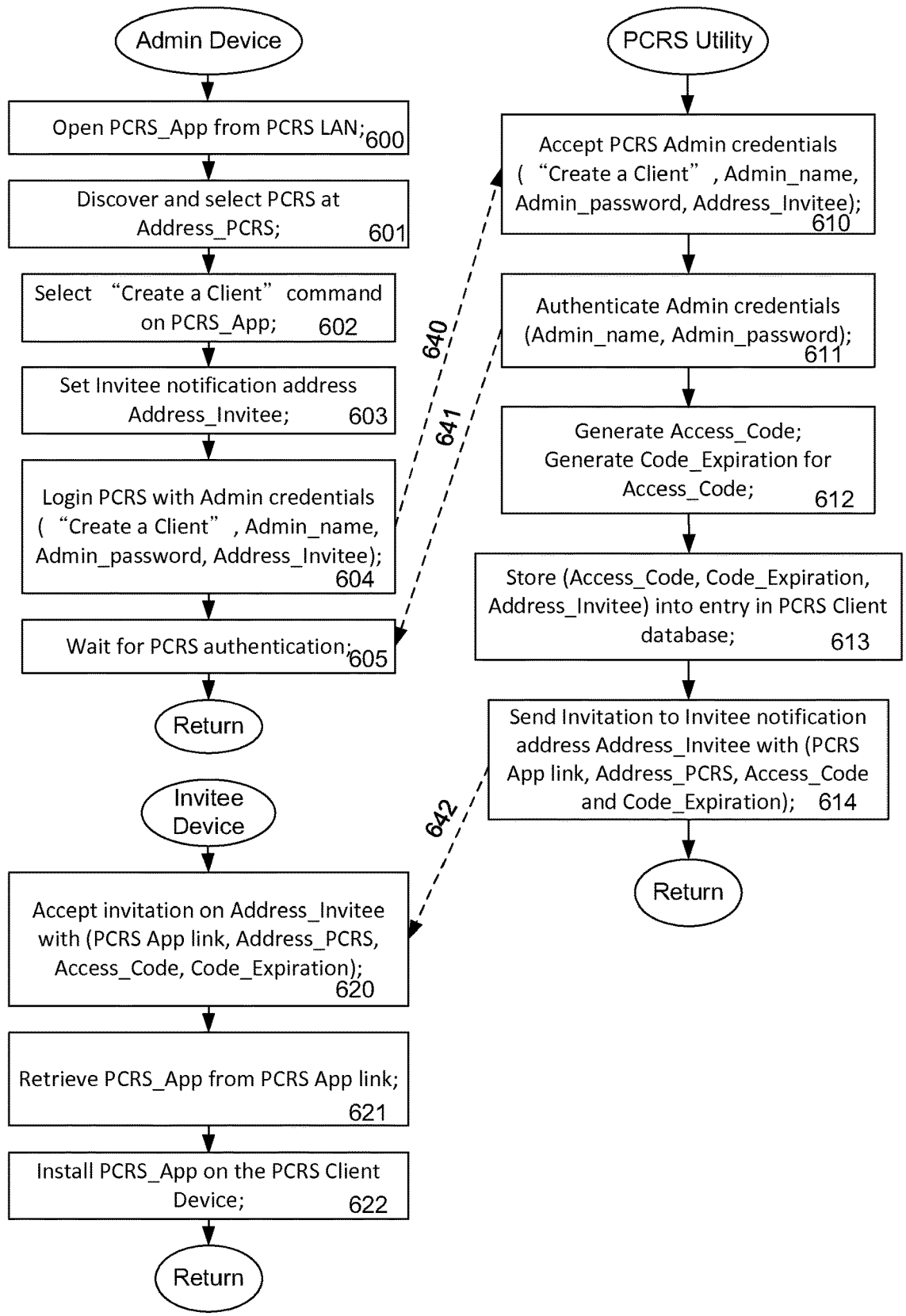
FIG. 6 shows the communication flow of creating a client for the Private Cloud Routing Server by the Admin in accordance with the present invention.

The utility PCRS_App is also used by the administrator to create a PCRS Client account, as shown in FIG. 6. The administrator then sets the Invitee notification address in PCRS_App 605. It then asks the PCRS to send connection invitation through the Routing Server Message Box utility 272, to Routing Server Message Box 216, through Client Message Box 215, and eventually to the Invitee Device 281, and it's Client Message Box Utility 282. Note that Routing Server Message Box 216 and Client Message Box 215 are both hosted inside message box servers, such as email servers, web servers and message servers. Both Routing Server Message Box and Client Message Box can logically be the same or different. After the invitee receives the invitation 620, it retrieves PCRS_App from the PCRS App link 621 and installs PCRS_App on a desired PCRS Client Device 277. The Invitee device 281 is not necessary at the same physical device as the PCRS Client Device 277. The administrator has to know the invitee's message box address Address_Invitee 605, in order to send out the invitation.

Figure 7:
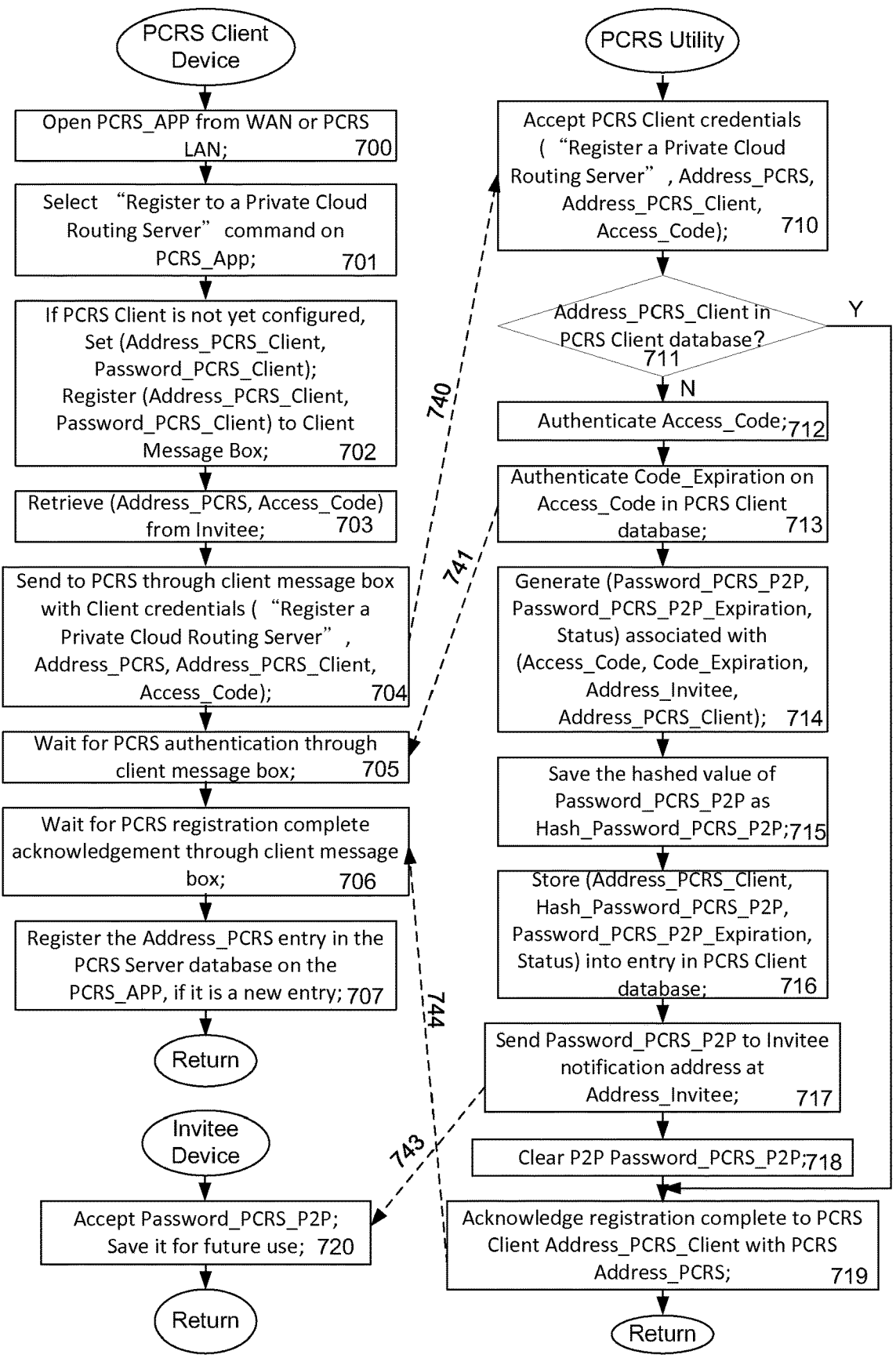
FIG. 7 shows the communication flow of Registering to a Private Cloud Routing Server by a PCRS Client in accordance with the present invention.

On the desired PCRS Client Device 277, the invitee launches the PCRS_App 700 and proceeds to register to a PCRS 701 as shown in FIG. 7. The invitee's role at this point changes to a PCRS Client on the PCRS Client Device 277. The PCRS Client then configures its Client Message Box credentials by setting its account name and password and registers the credentials to the Client Message Box 215. The previously received Address_PCRS and Access Code are then retrieved from the Invitee Device 281 and sent along with the Client Message account Address_PCRS_Client to PCRS 710 via 740. After authentication by the PCRS Utility 270 inside PCRS 208, a set of peer-to-peer connection credentials including Password_PCRS_P2P are generated 714. The actual Password is sent to the Invitee Device 281 through the Client Message Box 215. The hashed password along with other client credentials are stored in the PCRS Client database. The actual client P2P password is never stored in PCRS 208 for security reasons. However its hashed value is stored instead for comparison in authentication 716. As soon as the PCRS Client Device 277 receives acknowledgement from the PCRS 208 for registration 707, it records the PCRS identity Address_PCRS in the PCRS server database 279 in the PCRS_App 278.

There are a total of four commands provided in the PCRS_App for the Admin Device: "Initialize and Provision", "Create a Client", "View PCRS Client" and "Reset PCRS P2P Password/Edit Attributes", as shown in FIGS. 5, 6, 9 and 10. Whenever the Admin operation is involved, only the access to the PCRS from the PCRS LAN (be it physical or virtual) is allowed for security reasons. Due to the limited access, network traffic sniffing and hacking is avoided by conducting setting and configuration of PCRS solely on the PCRS LAN.

Figure 8:
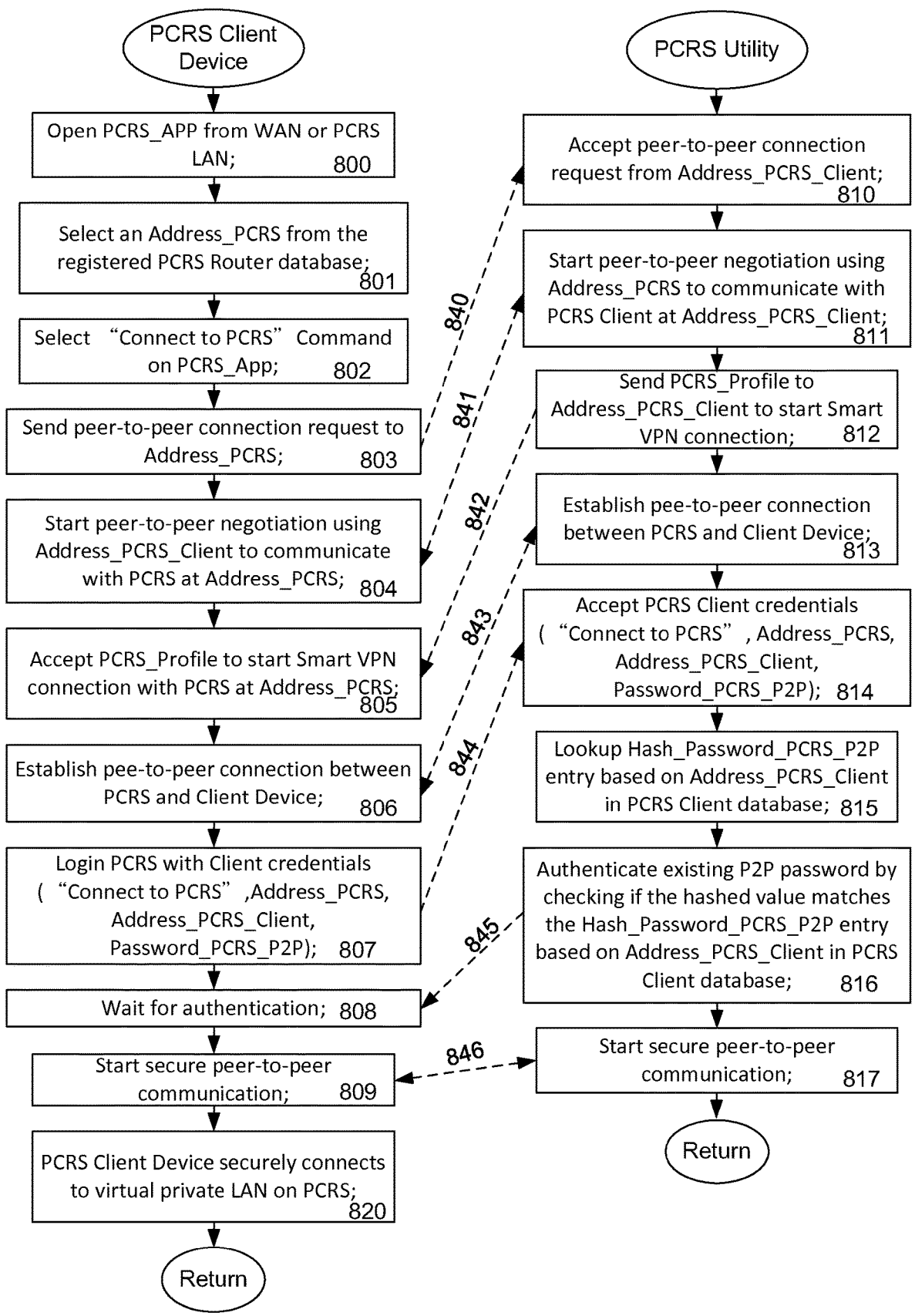
FIG. 8 shows the communication flow of Connection from the PCRS Client Device to the Private Cloud Routing Server by a PCRS Client in accordance with the present invention.
Figure 11:
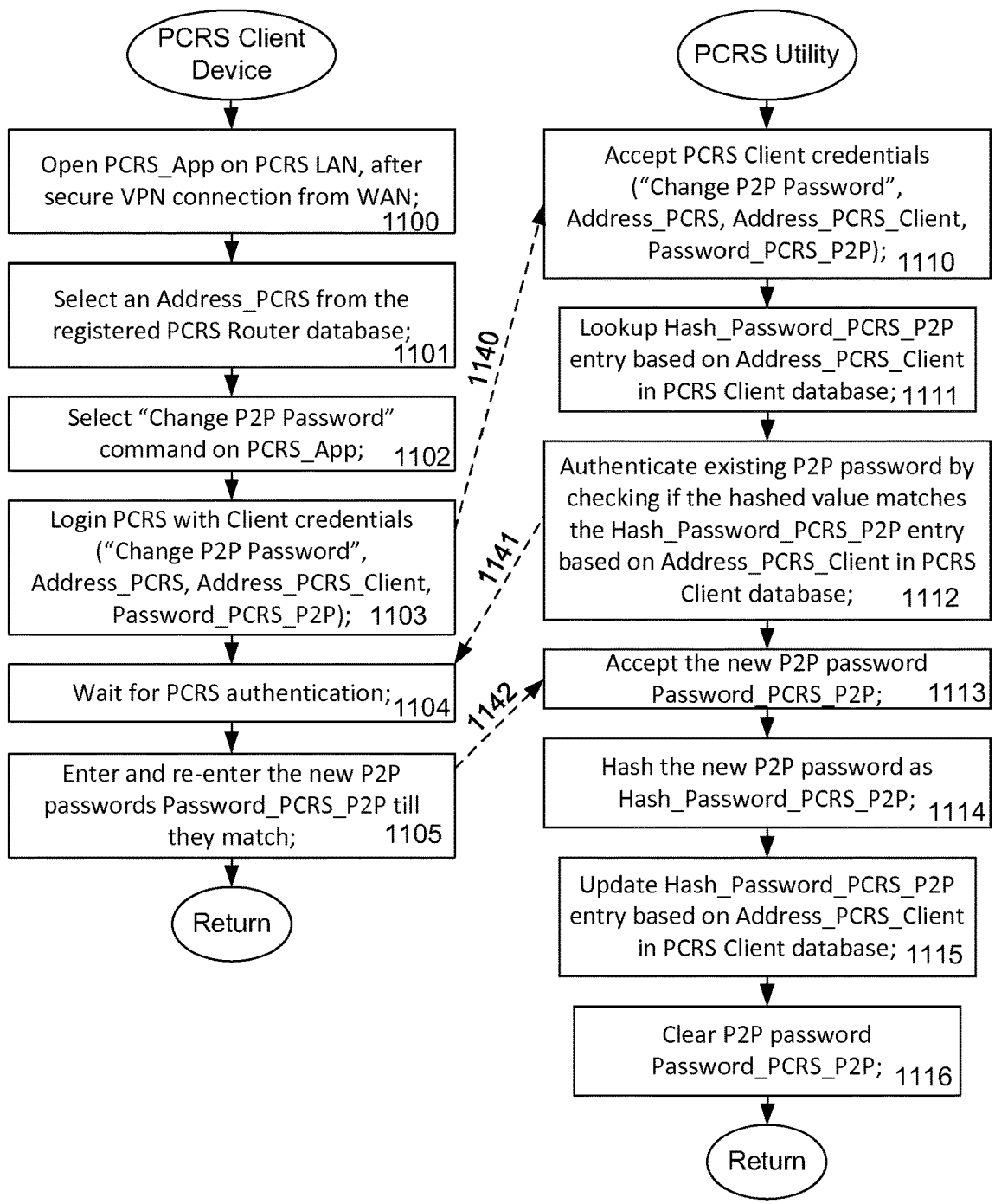
FIG. 11 shows the communication flow of changing peer-to-peer password of a PCRS Client Device by a PCRS Client in accordance with the present invention.

There are three commands provided in the PCRS_App for the PCRS Client Device: "Register to a PCRS", "Change P2P Password" and "Connect to PCRS", as shown in FIGS. 7, 8 and 11. In the case of "Register to a PCRS" command, the PCRS Client Device is able to run PCRS_App and connect to the PCRS Utility from either WAN or PCRS LAN. The PCRS Client Device is able to run PCRS_App and connect to the PCRS Utility from either WAN or PCRS LAN because the communication exchange between the PCRS Client Device and the PCRS Utility for registration to PCRS is through Client Message Box 215 and Routing Server Message Box 216, as shown in FIG. 7. In the case of "Change P2P Password" command, the PCRS Client Device has to run PCRS_App on PCRS LAN, after secure VPN connection from WAN, because the P2P Password can only be reset on the PCRS LAN for security reason. The only way for the PCRS Client Device to connect to PCRS LAN is through a secure VPN connection to the virtual LAN of PCRS, as shown in FIG. 11. In the case of "Connect to PCRS" command, the PCRS Client Device has yet to connect to the PCRS from anywhere either on WAN or PCRS LAN. The consequence of this command on the PCRS_App is the prerequisite for any secure and private connection between the PCRS Client Device and the PCRS, as is shown in FIG. 8.

Figure 3:
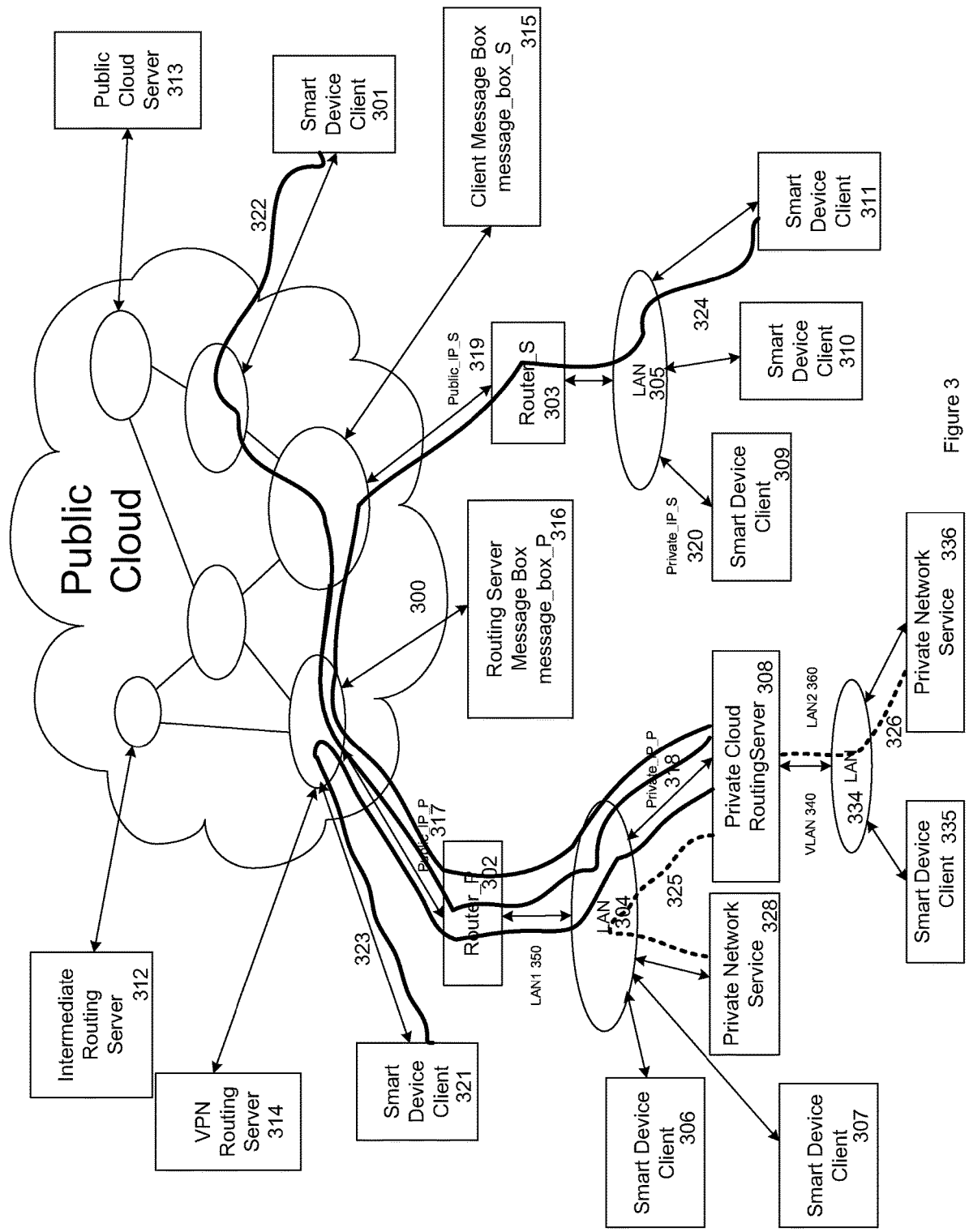
FIG. 3 is a block diagram of a second embodiment of a Cloud Network Infrastructure for the connection mechanism between the Private Cloud Routing Server and the Smart Device Client in accordance with the present invention.

FIG. 3 shows a block diagram of a second embodiment of the invention. The Private Cloud Routing Server 308 connects to the LAN of a Router_P 302, in a manner similar to the way Private Cloud Routing Server 208 connects to the LAN of a Router_P 202 in FIG. 2. The PCRS 308 also has a physical LAN LAN2 360 connecting downstream. A Private Network Service 336 and a Smart Device Client 335 are connected downstream. The Private Network Service 336 is accessible through the communication path 326, connecting through LAN 334 to Private Cloud Routing Server 308. As long as the virtual LAN 340, the physical LAN LAN1 350, and physical LAN LAN2 360 are all explorable and accessible by the Smart Device Clients 311, 310, 309, 301, 321, 306, and 335 across the cloud through the Private Cloud Routing Server 308, all Private Network Service 328, 336, and Smart Device Client 306, 335 become accessible.

Figure 4:
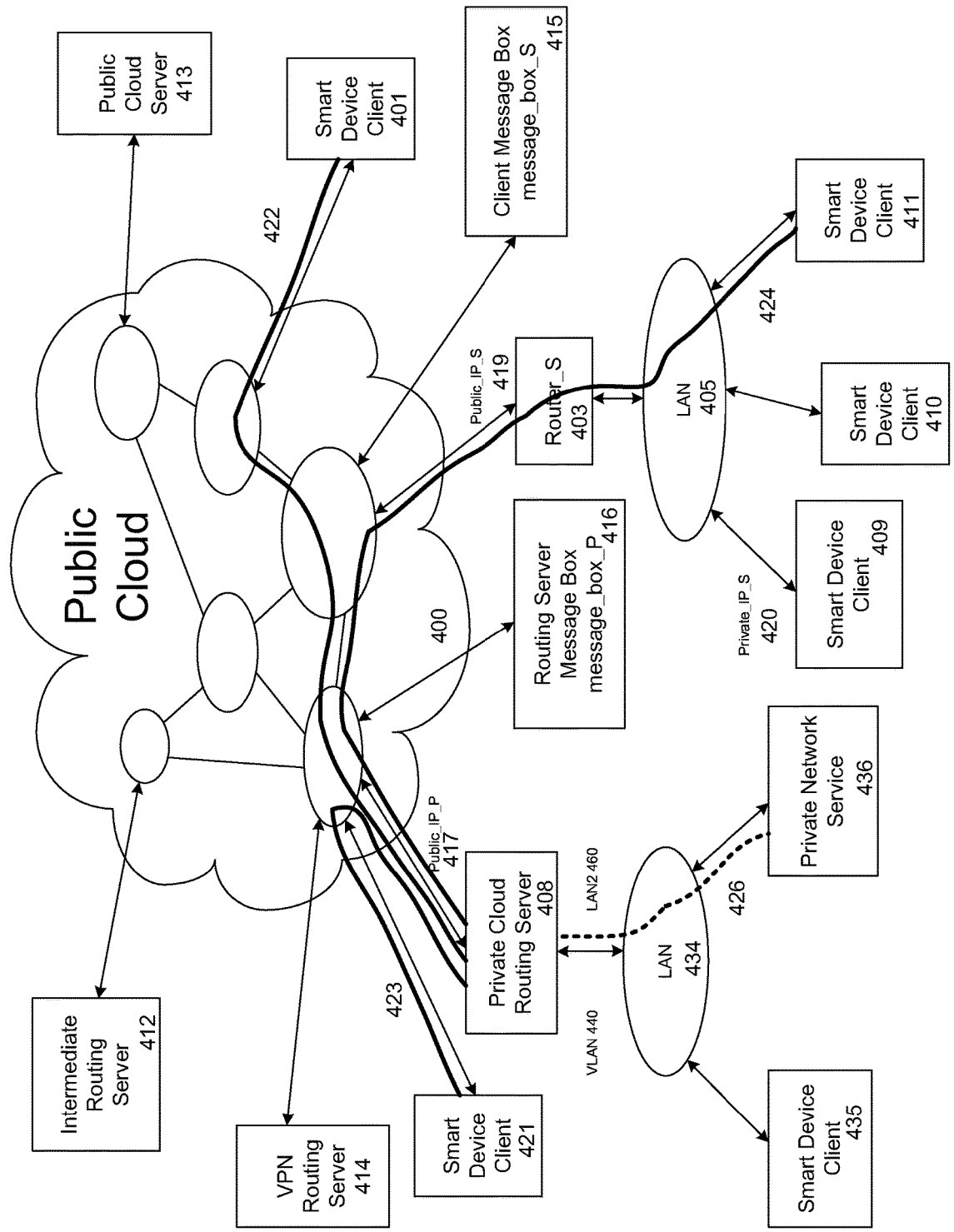
FIG. 4 is a block diagram of a third embodiment of a Cloud Network Infrastructure for the connection mechanism between the Private Cloud Routing Server and the Smart Device Client in accordance with the present invention.

FIG. 4 shows a block diagram of a third embodiment of the invention. The Private Cloud Routing Server 408 connects to the cloud and has a public_IP_P 417. The PCRS 408 also has a physical LAN LAN2 460 connecting downstream. A Private Network Service 436, and a Smart Device Client 435 are connected downstream. The Private Network Service 436 is accessible through the communication path 426, connecting through LAN 434 to Private Cloud Routing Server 408. As long as the virtual LAN 440, the physical LAN LAN2 460 are all explorable and accessible by the Smart Device Clients 411, 410, 409, 401, 421, and 435 across the cloud through the Private Cloud Routing Server 408, all Private Network Service 436, and Smart Device Client 435 become accessible.

FIG. 5 shows the communication flow of the Initializing and Provisioning of the Private Cloud Routing Server by the Admin in accordance with the present invention. As shown in FIG. 5, from the Admin Device standpoint, first connect the Admin device to the PCRS network on LAN, via step 500. Then, open PCRS_App from PCRS LAN, via step 501. Thereafter, discover and select PCRS Address_PCRS on LAN, via step 502. Then the "Initialize and Provision" command on PCRS_App is selected, via step 503. Thereafter, the PCRS is configured by setting address, password (Address_PCRS, Password_PCRS) as its identity, via step 504. Then the PCRS is logged in with Admin credentials ("Initialize and Provision", Admin_name, Admin_password, Address_PCRS, Password_PCRS), via step 505. The credentials are sent to PCRS Utility 510, via step 540. Thereafter, the Admin waits for PCRS authentication, via step 506. Then the Virtual LAN subnet and PCRS App link are configured, via step 507. The PCRS Utility 514 is sent, via step 542. Thereafter, the PCRS is joined to the existing access point router as a client, if desired, via step 508. Thereafter this information is sent to PCRS Utility 516 via step 543.

From PCRS Utility standpoint, accept PCRS Admin credentials ("Initialize and Provision", Admin_name, Admin_password, Address_PCRS, and Password_PCRS), via step 510. Thereafter, the Admin credentials (Admin_name, Admin_password) are authenticated, via step 511. Thereafter the credentials are sent to Admin Device 506, via step 541. Then (Address_PCRS, Password_PCRS) are stored as the identity for PCRS, via step 512. Then (Address_PCRS, Password_PCRS) are registered to a Routing Server Message Box, via step 513. Thereafter, the Virtual LAN subnet and PCRS App link are stored, via step 514. Thereafter the PCRS_Profile file is generated and saved including interface protocol, certificates and keys, via step 515. Finally, an existing access point router as a client is joined, if desired, via step 516.

FIG. 6 shows the communication flow of creating a client for Private Cloud Routing Server by the Admin in accordance with the present invention. From Admin Device standpoint, first the PCRS_App from PCRS LAN is opened, via step 600. Next, a PCRS at Address_PCRS is discovered and selected, via step 601. Thereafter a "Create a Client" command on PCRS_App is selected via step 602. Thereafter an Invitee notification address Address_Invitee is set, via step 603. Then the PCRS is logged in with Admin credentials ("Create a Client", Admin_name, Admin_password, Address_Invitee), via step 604. Thereafter the credentials are sent to a PCRS Utility, via step 640. Thereafter the administrator waits for PCRS authentication, via step 605.

From the PCRS Utility standpoint, first the PCRS Admin credentials ("Create a Client", Admin_name, Admin_password, Address_Invitee) are accepted, via step 610. Thereafter, the Admin credentials (Admin_name, Admin_password), are authenticated, via step 611. Then the credentials are sent to the Admin Device via step 641. Next, an Access_Code and Code_Expiration for Access_Code is generated, via step 612. Thereafter, (Access_Code, Code_Expiration, Address_Invitee) is stored into entry (Access_Code, Code_Expiration, Address_Invitee, Address_P-CRS_Client, Hash_Password_PCRS_P2P, Password_PCRS_P2P_Expiration, Status) in PCRS Client database, via step 613. Then an Invitation to Invitee notification address Address_Invitee with (PCRS app link, Address_PCRS, Access_Code and Code_Expiration) is sent, via step 614. Send to Invitee 620 via 642.

From Invitee Device standpoint, accept invitation on Address_Invitee with PCRS app link, Address_PCRS, Access_Code and Code_Expiration, via step 620. Then PCRS_App is retrieved from PCRS app link, via step 621. Finally the PCRS_App is installed on the PCRS Client Device, via step 622.

FIG. 7 shows the communication flow of Registering to a Private Cloud Routing Server by a PCRS Client in accordance with the present invention. From the PCRS Client Device standpoint, the PCRS_APP from the WAN or the PCRS LAN is open, via step 700. Next, the PCRS Client address (Address_PCRS_Client) is created, if necessary (not shown). Next, "Register a Private Cloud Routing Server" command on the PCRS_App is selected, via step 701. Next, if the PCRS Client is not yet configured, the Address_P-CRS_Client and the Password_PCRS_Client are set, via step 702, where the Password_PCRS_P2P is the message box password associated with message box 216 address for client at the Address_PCRS_Client for peer-to-peer communication. Next, the Address_PCRS_Client and the Password_PCRS_Client are registered to Client Message Box, via step 702. The Address_PCRS and the Access_Code are then retrieved from Invitee, via step 703. The information is originally received by the invitee device 620.

Next, the Address_PCRS and the Access_Code are sent to the PCRS through client message box with the Client credentials ("Register a Private Cloud Routing Server", Address_PCRS, Address_PCRS_Client, Access_Code), via step 704. Then the Address_PCRS and the Access_Code are sent to the PCRS Device 710, via step 740. Next, the PCRS Client Device waits for the PCRS authentication through client message box, via step 705. Then the PCRS Client Device waits for the PCRS registration complete acknowledgement through client message box, via step 706. Next, the Address_PCRS entry in the PCRS Server database is registered on the PCRS_App if it is a new entry, via step 707.

From the PCRS Utility standpoint, the PCRS Client credentials ("Register a Private Cloud Routing Server", Address_PCRS, Address_PCRS_Client, Access_Code) are accepted, via step 710. Verification is made to check if the Address_PCRS_Client is in the PCRS Client database, via step 712. If so, Invitee's designated PCRS Client address (Address_PCRS_Client) is acknowledged with the PCRS address (Address_PCRS), via step 719, then return. Otherwise, the Access_Code is authenticated, via step 712. Next, the Code_Expiration on Access_Code is authenticated in the PCRS Client database, via step 713. Next, the Code_Expiration on the Access_Code is sent to the PCRS Client Device 705 via 741. Next, (Password_PCRS_P2P, Password_PCRS_P2P_Expiration, Status) associated with (Access_Code, Code_Expiration, Address_Invitee, Address_PCRS_Client) are generated, via step 714. Next, the hashed value of the Password_PCRS_P2P is saved as Hash_Password_PCRS_P2P 715. Next, (Address_P-CRS_Client, Hash_Password_PCRS_P2P, Password_PCRS_P2P_Expiration, Status) are stored into entry (Access_Code, Code_Expiration, Address_Invitee, Address_PCRS_Client, Hash_Password_PCRS_P2P, Password_PCRS_P2P_Expiration, Status) in the PCRS Client database, via step 716. Next, the Password_PCRS_P2P is sent to Invitee notification address at Address_Invitee, via step 717. Next, the Password_PCRS_P2P is sent to Invitee 720, via step 743. Next, the Password_PCRS_P2P is cleared, via step 718. Next, Invitee's designated PCRS Client address (Address_PCRS_Client) is acknowledged with PCRS address (Address_PCRS), via step 719. Next, Invitee's designated PCRS Client address is sent to the PCRS Client Device 706, via step 744. From Invitee Device point of view, the Password_PCRS_P2P is accepted and saved for future use, via step 720.

FIG. 8 shows the communication flow of Connection from the PCRS Client Device to the Private Cloud Routing Server by a PCRS Client in accordance with the present invention. From the PCRS Client Device standpoint, the PCRS_APP is open from the WAN or the PCRS LAN, via step 800. Next, an Address_PCRS is selected from the registered PCRS Router database, via step 801. Next, "Connect to PCRS" command is selected on the PCRS_App, via step 802. Next, peer-to-peer connection request is sent to the Address_PCRS, via step 803. Next, the peer-to-peer connection request is sent to the PCRS Utility 810, via step 840. Next, peer-to-peer negotiation starts using the Address_PCRS_Client to communicate with the PCRS at Address_PCRS, via step 804. Next, the PCRS Client Device communicates with the PCRS Utility 811, via step 841. Next, the PCRS_Profile file is accepted to start the Smart VPN connection with the PCRS at the Address_PCRS, via step 805. Next, peer-to-peer connection is established between the PCRS and the Client Device, via step 806. Next, the PCRS Client Device communicates with the PCRS Utility 813, via step 843. Next, the PCRS is logged in with the Client credentials ("Connect to PCRS", Address_PCRS, Address_PCRS_Client, Password_PCRS_P2P), via step 807. Next, the Client credentials are sent to the PCRS Utility 814, via step 844. Next, the PCRS Client Device waits for authentication, via step 808. Next, secure peer-to-peer communication starts, via step 809. Next, the PCRS Client Device communicates with the PCRS Utility 817, via step 846. Next, the PCRS Client Device securely connects to the virtual private LAN on the PCRS, via step 820.

From PCRS Utility standpoint, peer-to-peer connection request is accepted from the Address_PCRS_Client, via step 810. Next, peer-to-peer negotiation starts using the Address_PCRS to communicate with the PCRS Client at the Address_PCRS_Client, via step 811. Next, the PCRS Utility communicates with the PCRS Client Device 804, via step 841. Next, the PCRS_Profile file is sent to the Address_PCRS_Client to start the Smart VPN connection, via step 812. Next, the PCRS_Profile file is sent to the PCRS Client Device 805, via step 842. Next, peer-to-peer connection is established between the PCRS and the Client Device, via step 813. Next, the PCRS Utility communicates with the PCRS Client Device 806, via step 843. Next, the PCRS Client credentials ("Connect to PCRS", Address_PCRS, Address_PCRS_Client, Password_PCRS_P2P) are accepted, via step 814. Next, entry list based on the Address_PCRS_Client in the PCRS Client database (Access_Code, Code_Expiration, Address_Invitee, Address_PCRS_Client, Hash_Password_PCRS P2P, Password_PCRS_P2P_Expiration, Status) is searched, via step 815. Next, existing peer-to-peer (P2P) password is authenticated by checking if the hashed value matches the Hash_Password_PCRS_P2P entry based on the Address_PCRS_Client in the PCRS Client database, via step 816. Next, existing peer-to-peer (P2P) password is sent to the PCRS Client Device 808, via step 845. Next, secure peer-to-peer communication starts, via step 817. Next, the PCRS Utility communicates with the PCRS Client Device 809, via step 846.

Figure 9:
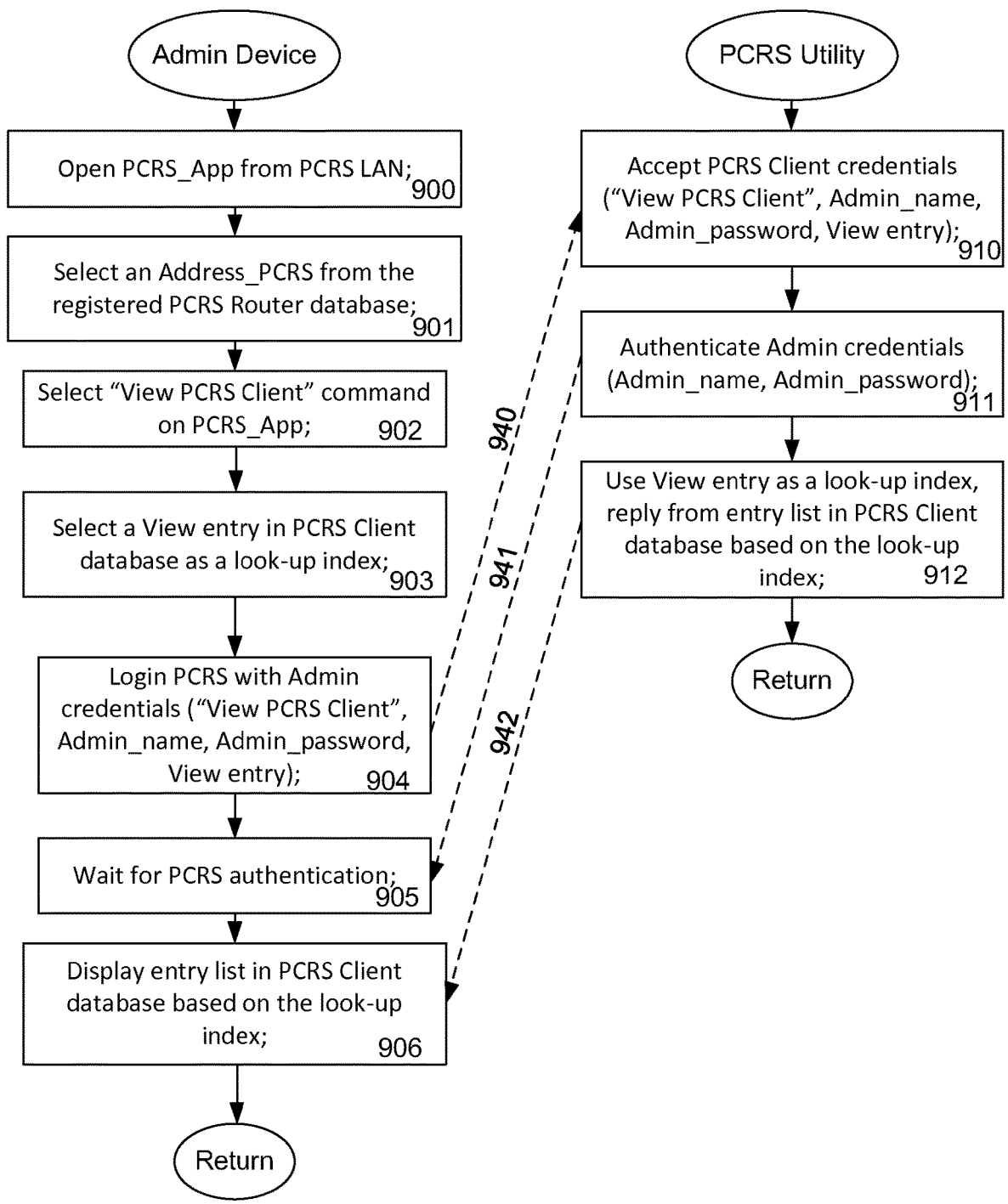
FIG. 9 shows the communication flow of Viewing Client of the Private Cloud.

FIG. 9 shows the communication flow of Viewing Client of the Private Cloud Routing Server by Admin in accordance with the present invention. From the Admin Device standpoint, the PCRS_App is open from the PCRS LAN, via step 900. Next, an Address_PCRS is selected from the registered PCRS Router database, via step 901. Next, "View PCRS Client" command is selected on the PCRS_App, via step 902. Next, a View entry in the PCRS Client database is selected as a look-up index, via step 903. Next, the PCRS is logged in with the Admin credentials ("View PCRS Client", Admin_name, Admin_password, View entry), via step 904. Next, the Admin credentials are sent to the PCRS Utility 910, via step 940. Next, the Admin Device waits for the PCRS authentication, via step 905. Next, entry list in the PCRS Client database (Access_Code, Code_Expiration, Address_Invitee, Address_PCRS_Client, Hash_Password_PCRS P2P, Password_PCRS_P2P_Expiration, and Status) is displayed based on the look-up index, via step 906.

From PCRS Utility standpoint, the PCRS Client credentials ("View PCRS Client", Admin_name, Admin_password, View entry) are accepted, via step 910. Next, the Admin credentials (Admin_name, Admin_password) are authenticated, via step 911. Next, the Admin credentials are sent to the Admin Device 905, via step 941. Next, the View entry is used as a look-up index, reply from entry list in the PCRS Client database (Access_Code, Code_Expiration, Address_Invitee, Address_PCRS_Client, Hash_Password_PCRS P2P, Password_PCRS_P2P_Expiration, Status) based on the look-up index, via step 912. Next, the replay is sent to the Admin Device 906, via step 942.

Figure 10:
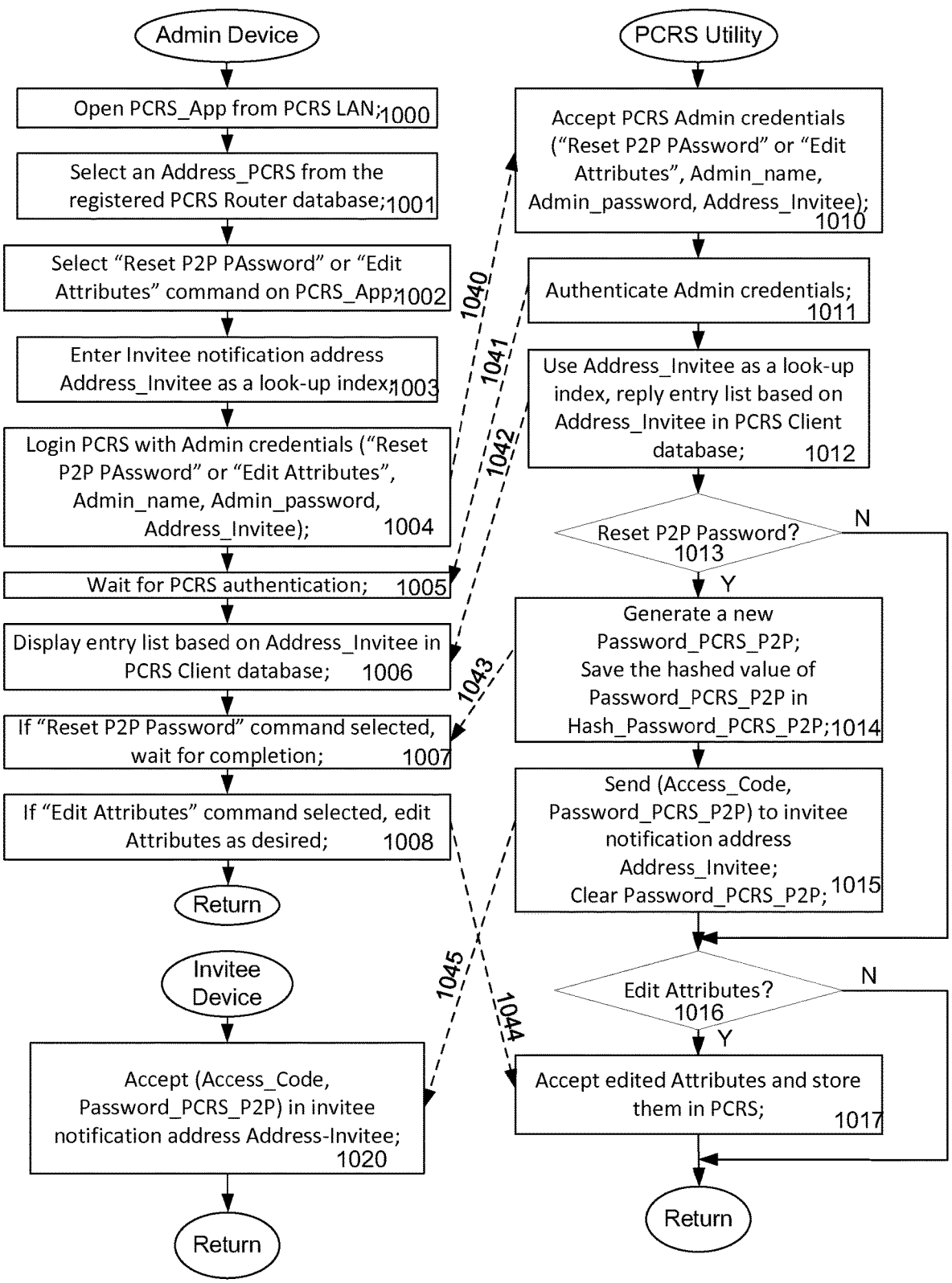
FIG. 10 shows the communication flow of Resetting peer-to-peer password and editing attributes of a PCRS Client Device by Admin in accordance with the present invention.

FIG. 10 shows the communication flow of Resetting peer-to-peer password and editing attributes of a PCRS Client Device by Admin in accordance with the present invention. From the Admin Device standpoint, the PCRS_App is open from the PCRS LAN, via step 1000. Next, an Address_PCRS is select from the registered PCRS Router database, via step 1001. Next, "Reset P2P Password/Edit Attributes" command is select on the PCRS_App, via step 1002. Next, the Invitee notification address Address_Invitee is entered as a look-up index, via step 1003. Next, the PCRS is logged in with the Admin credentials ("Reset P2P Password/Edit Attributes", Admin_name, Admin_password, and Address_Invitee), via step 1004. Next, the Admin credentials are sent to the PCRS Utility 1010, via step 1040. Next, the Admin Device waits for the PCRS authentication, via step 1005. Next, the entry list based on the Address_Invitee in the PCRS Client database (Access_Code, Code_Expiration, Address_Invitee, Address_PCRS_Client, Hash_Password_PCRS_P2P, Password_PCRS_P2P_Expiration, Status) is displayed, via step 1006. If "Reset P2P Password" command is selected, the Admin Device waits for completion, via step 1007. If "Edit Attributes" is selected, the Attributes are edited as desired, via step 1008. Next, the Attributes include but are not limited to Status of the PCRS Client (Active, Inactive, Deleted), the Virtual LAN subnet and the PCRS App link. Next, the Attributes are sent to the PCRS Utility 1017, via step 1044.

From the PCRS Utility standpoint, the PCRS Admin credentials ("P2P Password/Edit Attributes", Admin_name, Admin_password, and Address_Invitee) are accepted, via step 1010. The Admin credentials (Admin_name, Admin_ password) are authenticated, via step 1011. Next, the PCRS Admin credentials are sent to the Admin Device 1005, via step 1041. Next, the Address_Invitee is used as a look-up index, reply entry list based on Address_Invitee in PCRS Client database (Access_Code, Code_Expiration, Address_Invitee, Address_PCRS_Client, Hash_Password_PCRS_P2P, Password_PCRS_P2P_Expiration, and Status), via step 1012. Next, the replay is sent to the PCRS Utility 1006, via step 1042. If "Reset P2P Password" command is selected, via step 1013, a new Password_PCRS_P2P is generated; the hashed value of Password_PCRS_P2P in Hash_Password_PCRS_P2P is saved, via step 1014. Next, the new Password_PCRS_P2P is sent to the Admin Device 1007, via step 1043. Next, (Access_Code, Password_PCRS_P2P) is sent to invitee notification address Address_Invitee; Password_PCRS_P2P is cleared, via step 1015. Next, (Access_Code, Password_PCRS_P2P) is sent to Invitee 1020, via step 1045. If "Edit Attributes" command is selected, via step 1016, the edited Attributes are accepted and stored in the PCRS, via step 1017.

From the Invitee Device standpoint, (Access_Code, Password_PCRS_P2P) are accepted in invitee notification address Address-Invitee, via step 1020.

FIG. 11 shows the communication flow of changing peer-to-peer password of a PCRS Client Device by a PCRS Client in accordance with the present invention. From the PCRS Client Device standpoint, the PCRS_App is open on the PCRS LAN after secure VPN connection from the WAN, via step 1100. Next, an Address_PCRS is selected from the registered PCRS Router database, via step 1101. Next, "Change P2P Password" command is selected on the PCRS_App, via step 1102. The PCRS is logged in with the Client credentials ("Change P2P Password", Address_PCRS, Address_PCRS_Client, and Password_PCRS_P2P), via step 1103. Next, the Client credentials are sent to the PCRS Utility 1110, via step 1140. Next, the PCRS Client Device waits for the PCRS authentication, via step 1104. Next, the new P2P passwords are entered and re-entered till they match, via step 1105. Next, the new P2P passwords are sent to the PCRS Utility 1113, via step 1142.

From PCRS Utility standpoint, the PCRS Client credentials ("Change P2P Password", Address_PCRS, Address_PCRS_Client, and Password_PCRS_P2P) are accepted, via step 1110. Next, the Hash_Password_PCRS_P2P entry is searched based on the Address_PCRS_Client in the PCRS Client database, via step 1111. Next, existing P2P password is authenticated by checking if the hashed value matches the Hash_Password_PCRS_P2P entry based on the Address_PCRS_Client in the PCRS Client database (Access_Code, Code_Expiration, Address_Invitee, Address_PCRS_Client, Hash_Password_PCRS_P2P, Password_PCRS_P2P_Expiration, Status), via step 1112. Next, the existing P2P password is sent to the PCRS Client Device 1104, via step 1141. Next, the new P2P password Password_PCRS_P2P is accepted, via step 1113. Next, the new P2P password is hashed as Hash_Password_PCRS_P2P, via step 1114. Next, the Hash_Password_PCRS_P2P entry is updated based on the Address_PCRS_Client in the PCRS Client database (Access_Code, Code_Expiration, Address_Invitee, Address_PCRS_Client, Hash_Password_PCRS_P2P, Password_PCRS_P2P_Expiration, and Status), via step 1115. Next, the P2P password Password_PCRS_P2P is cleared, via step 1116.

Figure 12:
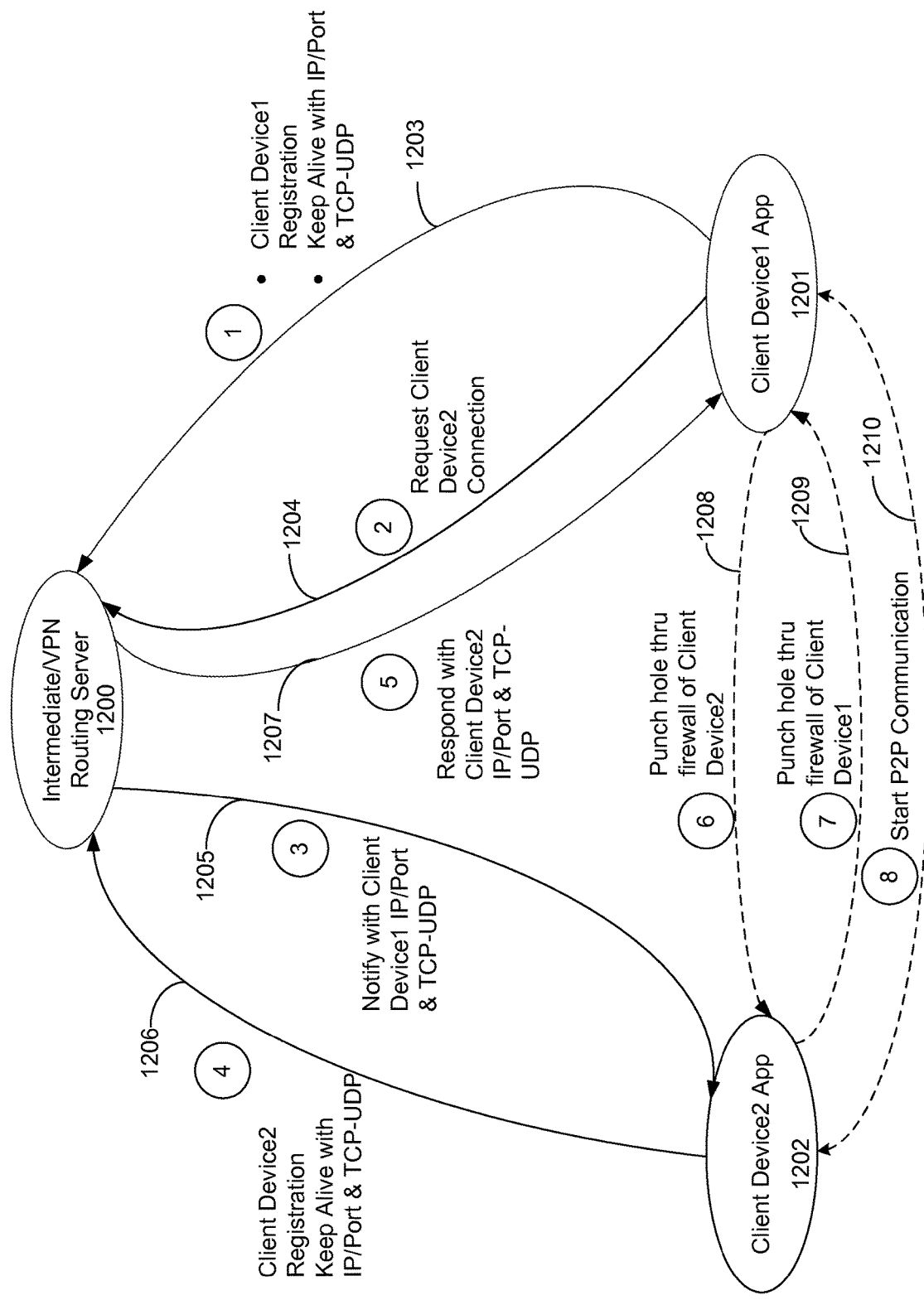
FIG. 12 shows the communication flow of P2P Connection Mechanism between a Client Device1 and a Client Device2 through Cloud Network (Prior Art).

FIG. 12 shows the communication flow of P2P Connection Mechanism between a Client Device1 and a Client Device2 through Cloud Network (Prior Art). A Client Device1 and a Client Device2 on Cloud Network can communicate with each other through a publicly accessible Intermediate Routing Server or a VPN Routing Server 112, 114. The Client Device1 App 1201 first register to the Intermediate/VPN Routing Server Utility 1200 with its IP address and port capability in TCP/UDP protocols. The Client Device1 App, IP address and ports are kept alive with the routing server 1203. The Client Device1 then requests to the routing server utility 1200 for connection to the Client Device2 1204. The routing server utility 1200 then notifies the Client Device2 Utility 1202 with the IP address and port capability in TCP/UDP protocols of the Client Device1 and its intention to connect 1205. The Client Device2 App 1202 then replies to the routing server utility 1200 with its own registration that includes its IP address and port capability in TCP/UDP protocols. The IP address and port capability of the Client Device2 are kept alive with connection to the routing server utility 1200. The routing server utility 1200 then responds to the Client Device1 App 1201 with the IP address and port capability in TCP/UDP protocols of the Client Device2 1207. After receiving the IP address and port capability in TCP/UDP protocols of the Client Device2, the Client Device1 App 1201 starts punching holes through the firewall of the Client Device2 1208. The Client Device2 App 1202 also starts punching holes through the firewall of the Client Device1 1209. Eventually, both sides of the firewall holes are punched through. The peer-to-peer communication starts between the Client Device1 and the Client device2 1210. Note that without the publicly accessible Intermediate/VPN Routing Server, the connection mechanism between the routing server utility and either Client Device1 or Device2 is not possible. It is the fundamental flaw of the connection mechanism that has to rely on a publicly accessible intermediate/VPN Routing Server.

Figure 13:
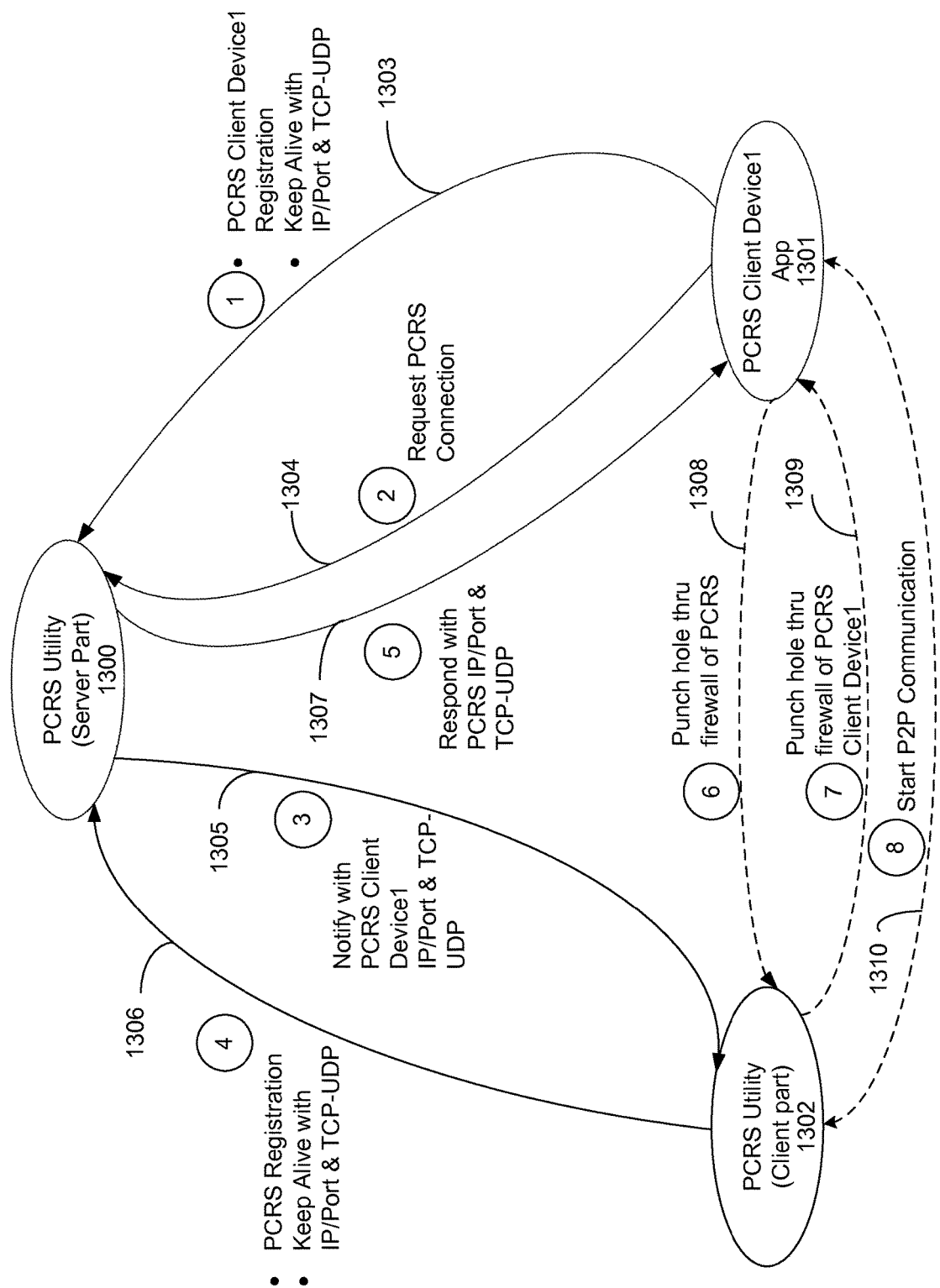
FIG. 13 is a diagram of a communication flow of P2P Connection Mechanism between PCRS and a PCRS Client Device through a Cloud Network.

FIG. 13 is a diagram of a communication flow of P2P Connection Mechanism between PCRS and a PCRS Client Device through a Cloud Network. It shows in accordance to the present invention that no publicly accessible Intermediate/VPN Routing Server is required for the Client Devices to connect and access to either the Server, or another Client Device, or the network services under the server through Cloud Network. As shown in FIG. 13, a Client Device1 and a Private Cloud Routing Server (PCRS) on Cloud Network can communicate with each other without going through a publicly accessible Intermediate Routing Server or a VPN Routing Server 112, 114. The Client Device1 App 1301 first requests to connect to the PCRS Utility (Server part) 1300 through Client Message Box 215, and PCRS Utility 803 as shown in FIG. 8, with its IP address and port capability in TCP/UDP protocols. The PCRS Client Device1 App, IP address and ports are kept alive with the PCRS Utility 1303. The PCRS Utility (Server part) receives the registration through Routing Server Message Box 216. The PCRS Client Device1 then requests to the PCRS Utility (Server part) 1300 also through Client Message Box 215 for connection to the PCRS Utility (Client part) 1304. The PCRS Utility (Server part) 1300 receives the request through Routing Server Message Box 216 and notifies the PCRS Utility (Client part) 1302 with the IP address and port capability in TCP/UDP protocols of the PCRS Client Device1 and its intention to connect 1305. The PCRS Utility (Client part) 1302 then replies to the PCRS Utility (Server part) 1300 with its own registration that includes its IP address and port capability in TCP/UDP protocols. The IP address and port capability of the Client Device2 are kept alive with connection to the PCRS Utility (Server part) 1300. The PCRS Utility (Server part) 1300 then responds to the Client Device1 App 1301 with the IP address and port capability in TCP/UDP protocols of the Client Device2 1307 through Routing Server Message Box 216. After receiving the IP address and port capability in TCP/UDP protocols of the PCRS Utility (Client part) through Client Message Box 215, the PCRS Client Device1 App 1301 starts punching holes through the firewall of the PCRS Utility (Client part) 1308. The PCRS Utility (Client part) 1302 also starts punching holes through the firewall of the PCRS Client Device1 1309. Eventually, both sides of the firewall holes are punched through. The peer-to-peer communication starts between the PCRS Client Device1 and the PCRS Utility (Client part) 1310. All information exchange between the PCRS Utility and the PCRS Client Device1 are through Routing Server Message Box 216 and Client Message Box 215, instead of going through a publicly accessible Intermediate Routing Server 212 or a VPN Routing Server 214. PCRS Client Device1 can then securely connect to virtual private LAN on PCRS as shown in 820. The PCRS Client Device1 is able to access any client device 206 or private network service 228 accessible under the PCRS. Other PCRS Client devices 201, 221, 209, 210, 211 can connect to the PCRS through the same connection mechanism as shown in FIG. 13. Once any pair of PCRS Client Devices connect to the virtual private LAN 240 of the PCRS, they can conduct the private and secure communication between themselves for text, audio or video communication.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method to communicate in a public cloud network, comprising:
    setting up a private cloud routing server (PCRS) and a smart device client in a client server relationship,
        wherein the PCRS includes a routing server message box utility to access a first message box located on a public cloud network,
        wherein the PCRS registers public and private IP addresses of the smart device client,
        wherein the smart device client includes a client message box utility to access a second message box located on the public cloud network, and
        wherein the PCRS sends a session based acknowledgement with public and private IP addresses of the PCRS to the second message box;
    passing, by the routing server message box utility of the PCRS, a session based message between the first message box and the second message box in a security process,
        wherein the security process to pass the session based message between the first message box and the second message box of the PCRS and the smart device client, respectively, includes:
            initializing and provisioning of the PCRS,
            creation of a PCRS Client,
            viewing the PCRS Client,
            editing a peer-to-peer password and status of the PCRS, and
            changing a PCRS peer-to-peer password by the smart device client and connecting to the PCRS by the smart device client,
        wherein the smart device client connects to the PCRS by at least one connection of:
            the smart device client determines a target is in a locally accessible Local Area Network (LAN) and decides to connect to the PCRS directly,
            the smart device client determines the target is not in the locally accessible LAN and decides to connect through a WAN to the public cloud network, and wherein the WAN locates a router and the LAN, and connects to the PCRS, and
            the smart device client determines the target is not in the locally accessible LAN and decides to pass through the LAN and the router, and connects to the public cloud network in the WAN,
        wherein a secure session based message is authenticated by the PCRS and the smart device client,
        wherein the smart device client and the PCRS communicates with each other after the session based message is authenticated, and
        wherein a private network service is then securely accessible by the smart device client through the public cloud network based upon the authenticated session based message; and
    setting up at least another smart device client in a client server relationship with the PCRS,
        wherein the smart device client and the at least another smart device client communicates with the PCRS after the session based message is authenticated, and
        wherein the smart device client and the at least another smart device client privately and securely communicates with each other through the public cloud network.

2. The method of claim 1, wherein the PCRS comprises:
    a computing device;
    a connection to a network;
    a program, when executed by the computing device, causes the PCRS to:
    create and manage an authorized client list to accommodate a plurality of smart device clients;
    send a session based invitation to the second message box;
    retrieve a session based access request of the smart device client from the first message box; and
    send a session based acknowledgement to the second message box.

3. The method of claim 2, wherein the program, when executed by the computing device, causes the PCRS to:
    send a communication request to the smart device client;
    punch a hole in a router to stay open pending a smart device client response;
    wait for the router to bind a network connection between the smart device client and the PCRS;
    route incoming request from the smart device client to the PCRS;
    establish a secure peer-to-peer communication with the smart device client;
    enable access of the private network service from the smart device client; and
    enable private and secure communication between the smart device client and the at least another smart device client.

4. The method of claim 2, wherein the smart device client comprises:
a computing device;
a connection through a router to a network;
wherein the router has a program, when executed by the computing device, causes the smart device client to:
retrieve a session based invitation from the smart device client message box;
send a session based access request to the PCRS message box;
retrieve a session based acknowledgement from the smart device client message box;
send a communication request to the PCRS;
punch a hole in the router to stay open pending the PCRS response;
wait for the router to bind a network connection between the PCRS and the smart device client;
route incoming request from the PCRS to the smart device client;
establish a secure peer-to-peer communication with the PCRS;
access the private network service through the PCRS; and
communicate with at least another smart device client through the PCRS.

5. The method of claim 4, wherein the program, when executed by the computing device, causes the smart device client to:
access the PCRS from anywhere at anytime;
access the PCRS behind a firewall with fixed or dynamic IP addresses,
wherein the smart device client:
requires no outside or public cloud based routing server in a wide area network (WAN),
requires no additional router setup in a local area network (LAN), and
establishes a secure peer-to-peer communication channel with the PCRS;
access private network service through the PCRS; and
communicate with at least another smart device client through the PCRS.

6. The method of claim 4, wherein the program, when executed by the computing device, causes the smart device client to:
access the PCRS from anywhere at anytime;
access the PCRS behind a firewall with fixed or dynamic IP addresses, wherein the smart device client:
requires no outside or public cloud based routing server in a wide area network (WAN),
requires no additional router setup in the a local area network (LAN, and
establishes a secure peer-to-peer communication channel with the PCRS;
mapping local physical I/O to virtual PCRS I/O;
accessing private network service through the PCRS; and
communicating with at least another smart device client through the PCRS.

7. The method of claim 2, wherein the smart device client comprises:
a computing device;
a connection to a network, wired or wireless;
a program, when executed by the computing device, causes the smart device client to:
retrieve a session based invitation from the smart device client message box;
send a session based reply to the PCRS message box;
retrieve a session based acknowledgement from the smart device client message box;
send an access request to the PCRS;
wait for the PCRS response;
bind a network connection between the PCRS and the smart device client;
route incoming request from the PCRS to the smart device client;
establish a secure peer-to-peer communication with the PCRS;
access the private network service through the PCRS; and
communicate with the at least another smart device client through the PCRS.

8. The method of claim 7, wherein the program, when executed by the computing device, causes the smart device client to:
access the PCRS from anywhere at anytime; and
access the PCRS behind the firewall with fixed or dynamic IP addresses, wherein the smart device client:
requires no outside or public cloud based routing server in the a wide area network (WAN);
requires no additional router setup in a local area network (LAN);
establishes a secure peer-to-peer communication with the PCRS;
access private network service through the PCRS; and
communicate with the at least another smart device client through the PCRS.

9. The method of claim 7, wherein the program, when executed by the computing device, causes the smart device client to:
access the PCRS from anywhere at anytime;
access the PCRS behind the firewall with fixed or dynamic IP addresses, wherein the smart device client:
requires no outside or public cloud based routing server in a wide area network (WAN),
requires no additional router setup in a local area network (LAN), and
establishes a secure peer-to-peer communication with the PCRS,
map local physical I/O to virtual server I/O;
access private network service through the PCRS; and
communicates with the at least another smart device client through the PCRS.

10. A method for providing a secure session based message connection mechanism between a private cloud routing server (PCRS) and a smart device client in a PCRS network, comprising:
setting up the PCRS and the smart device client in a client server relationship,
wherein the PCRS includes a routing server message box utility to access a first message box located on a public cloud network,
wherein the PCRs registers public and private IP addresses of the smart device client,
wherein the smart device client includes a client message box utility to access a second message box located on the public cloud network, and
wherein the PCRS sends a session based acknowledgement with public and private IP addresses of the PCRS to the second message box;
passing, by the routing server message box utility of the PCRS, a session based message between the first message box and the second message box in a security process, wherein the security process to pass the session based message between the first message box and the second message box of the PCRS and the smart device client, respectively, includes:
   initializing and provisioning of the PCRS;
   creating a PCRS Client;
   viewing the PCRS Client;
   editing a peer-to-peer password and status of the PCRS;
   changing the peer-to-peer password by the smart device client;
   resetting the peer-to-peer password and status by an administrator from a PCRS LAN; and
   connecting to the PCRS by the smart device client, wherein the smart device client connects to the PCRS by at least one connection of:
      determining, by the smart device client, a target is in a locally accessible Local Area Network (LAN) and deciding to connect to the PCRS directly,
      determining, by the smart device client, the target is not in the locally accessible LAN and deciding to connect through a WAN to the public cloud network, and wherein the WAN locating a router and the LAN, and connecting to the PCRS, and
      determining, by the smart device client, the target is not in the locally accessible LAN and decides to pass through the LAN and the router, and connects to the public cloud network in the WAN.

11. A method for a communication flow of a connection mechanism between a private cloud routing server (PCRS) and a PCRS Client Device through a Cloud Network, comprising:
   requesting by a client device application to connect to a PCRS Utility through a Client Message Box, wherein a server portion of the PCRS Utility receives a registration through a routing server message box;
   requesting by the PCRS Client Device to the server portion of the PCRS Utility through the Client Message Box a connection to a client portion of the PCRS Utility;
   receiving by the server portion of the PCRS Utility the request through a Routing Server Message Box;
   notifying the client portion of the PCRS Utility by the server portion of the PCRS utility of an intention of the server portion to connect;
   replying by the client portion of the PCRS Utility with a registration to the server portion of the PCRS Utility;
   responding by the server portion of the PCRS Utility to the client device application through the Routing Server Message Box;
   punching holes through a firewall of the client portion of the PCRS Utility;
   punching holes through a firewall of the PCRS Client Device;
   registering by the PCRS Utility the public and private IP addresses of the PCRS Client Device;
   sending by the PCRS Utility a session based acknowledgement with the public and private IP addresses of the PCRS to the Client Message Box; and
   starting peer-to-peer communication between the PCRS Client Device and the client portion of the PCRS Utility,
      wherein information exchange between the PCRS Utility and the PCRS Client Device is through the Routing Server Message Box and the Client Message Box,
      wherein the PCRS Client Device connects to the client portion of the PCRS Utility by at least one connection of:
         the PCRS Client Device determines the client portion of the PCRS Utility is in a locally accessible Local Area Network (LAN) and decides to connect to the PCRS Utility directly,
         the PCRS Client Device determines the client portion of the PCRS Utility is not in the locally accessible LAN and decides to connect through a WAN to the cloud network, and wherein the WAN locates a router and the LAN, and connects to the PCRS Utility, and
         the PCRS Client Device determines the client portion of the PCRS Utility is not in the locally accessible LAN and decides to pass through the LAN and the router, and connects to the cloud network in the WAN.

12. The method of claim 11,
   wherein either of the Routing Server Message Box or the Client Message Box, are hosted inside an email server, text message server, web server, or a server that is configured to host secure message for information exchange between the PCRS, and the PCRS Client Device;
   wherein the Routing Server Message Box or the Client Message Box, is accessible and under the secure and private control of either the PCRS or the PCRS Client Device; and
   wherein if the Routing Server Message Box or the Client Message Box is down, the downed Routing Server Message Box or the Client Message Box is replaced or redeployed immediately without interrupting the communication between the PCRS and the PCRS Client Device in the Cloud Network.

13. A non-transitory computer-readable medium storing executable instructions that, in response to execution, cause a computer to perform operations comprising:
   setting up a private cloud routing server (PCRS) and a smart device client in a client server relationship,
      wherein the PCRS includes a routing server message box utility to access a first message box located on a public cloud network,
      wherein the PCRS registers public and private IP addresses of the smart device client, and
      wherein the smart device client includes a client message box utility to access a second message box located on the public cloud network, and
      wherein the PCRS sends a session based acknowledgement with public and private IP addresses of the PCRS to the second message box;
   passing, by the routing server message box utility of the PCRS, a session based message between the first message box and the second message box in a security process,
      wherein the security process to pass the session based message between the first message box and the second message box of the PCRS and the smart device client, respectively, includes:
         initializing and provisioning of the PCRS,
         creation of a PCRS Client,
         viewing the PCRS Client,
         editing a peer-to-peer password and status of the PCRS, and
         changing a PCRS peer-to-peer password by the smart device client and connecting to the PCRS by the smart device client, wherein the smart device client connects to the PCRS by at least one connection of:
the smart device client determines a target is in a locally accessible Local Area Network (LAN) and decides to connect to the PCRS directly,
the smart device client determines the target is not in the locally accessible LAN and decides to connect through a WAN to the public cloud network, and wherein the WAN locates a router and the LAN, and connects to the PCRS, and
the smart device client determines the target is not in the locally accessible LAN and decides to pass through the LAN and the router, and connects to the public cloud network in the WAN,
wherein a secure session based message is authenticated by the PCRS and the smart device client,
wherein the smart device client and the PCRS communicates with each other after the session based message is authenticated, and
wherein a private network service is then securely accessible by the smart device client through the public cloud network based upon the authenticated session based message; and setting up at least another smart device client in a client server relationship with the PCRS,
wherein the smart device client and the at least another smart device client communicates with the PCRS after the session based message is authenticated, and
wherein the smart device client and the at least another smart device client privately and securely communicates with each other through the public cloud network.

14. A non-transitory computer-readable medium storing executable instructions that, in response to execution, cause a computer to perform operations comprising:
requesting by a client device application to connect to a PCRS Utility through a Client Message Box, wherein a server portion of the PCRS Utility receives a registration through a routing server message box;
requesting by the PCRS Client Device to the server portion of the PCRS Utility through the Client Message Box a connection to a client portion of the PCRS Utility;
receiving by the server portion of the PCRS Utility the request through a Routing Server Message Box;
notifying the client portion of the PCRS Utility by the server portion of the PCRS utility of an intention of the server portion to connect;
replying by the client portion of the PCRS Utility with a registration to the server portion of the PCRS Utility;
responding by the server portion of the PCRS Utility to the client device application through the Routing Server Message Box;
punching holes through a firewall of the client portion of the PCRS Utility;
punching holes through a firewall of the PCRS Client Device;
registering by the PCRS Utility the public and private IP addresses of the PCRS Client Device;
sending by the PCRS Utility a session based acknowledgement with the public and private IP addresses of the PCRS to the Client Message Box;
and
starting peer-to-peer communication between the PCRS Client Device and the client portion of the PCRS Utility,
wherein information exchange between the PCRS Utility and the PCRS Client Device is through the Routing Server Message Box and the Client Message Box,
wherein the PCRS Client Device connects to the client portion of the PCRS Utility by at least one connection of:
the PCRS Client Device determines the client portion of the PCRS Utility is in a locally accessible Local Area Network (LAN) and decides to connect to the PCRS Utility directly,
the PCRS Client Device determines the client portion of the PCRS Utility is not in the locally accessible LAN and decides to connect through a WAN to the cloud network, and wherein the WAN locates a router and the LAN, and connects to the PCRS Utility, and
the PCRS Client Device determines the client portion of the PCRS Utility is not in the locally accessible LAN and decides to pass through the LAN and the router, and connects to the cloud network in the WAN.

* * * * *